US006817778B2

(12) United States Patent
Kang et al.

(10) Patent No.: US 6,817,778 B2
(45) Date of Patent: Nov. 16, 2004

(54) HIGH-PRECISION FEMALE FORMAT MULTIFIBER CONNECTOR

(75) Inventors: Keith Kang, Hollis, NH (US); Greg Dudoff, Amherst, NH (US)

(73) Assignee: Xanoptix, Inc., Merrimack, NH (US)

( * ) Notice: Subject to any disclaimer, the term of this patent is extended or adjusted under 35 U.S.C. 154(b) by 0 days.

(21) Appl. No.: 10/607,620

(22) Filed: Jun. 27, 2003

(65) Prior Publication Data

US 2004/0028344 A1 Feb. 12, 2004

Related U.S. Application Data

(63) Continuation of application No. 10/098,652, filed on Mar. 14, 2002, now Pat. No. 6,609,835, and a continuation of application No. 10/098,255, filed on Mar. 14, 2002, now Pat. No. 6,619,855, and a continuation of application No. 10/098,990, filed on Mar. 14, 2002, now Pat. No. 6,629,780, each is a continuation-in-part of application No. 09/896,664, filed on Jun. 29, 2001, now Pat. No. 6,773,166, and a continuation-in-part of application No. 09/896,513, filed on Jun. 29, 2001, and a continuation-in-part of application No. 09/896,196, filed on Jun. 29, 2001, and a continuation-in-part of application No. 09/896,192, filed on Jun. 29, 2001.

(51) Int. Cl.[7] .............................................. G02B 6/38
(52) U.S. Cl. ......................................... 385/60; 385/78
(58) Field of Search .............................. 385/52, 60, 78, 385/89, 95–99

(56) References Cited

U.S. PATENT DOCUMENTS

| 3,825,318 | A | 7/1974 | Croset et al. |
| 4,230,385 | A | 10/1980 | Ammon et al. |
| 4,744,627 | A | 5/1988 | Chande et al. |
| 4,966,432 | A | 10/1990 | Okada et al. |
| 5,175,928 | A | 1/1993 | Grabbe |
| 5,214,730 | A | 5/1993 | Nagasawa et al. |
| 5,241,612 | A | 8/1993 | Iwama |
| 5,259,052 | A | 11/1993 | Briggs et al. |

(List continued on next page.)

OTHER PUBLICATIONS

Ayliffe, M.H., "Optomechanical, electrical and thermal packaging of large 2D optoelectronic device arrays for free–space optical interconnects", *SPIE*, vol. 3490, pp. 502–505.

Basavanhally, N.R. et al., "Optoelectronic Packaging of Two–Dimensional Surface Active Devices", *IEEE Transactions On Components, Packaging, And Manufacturing Technology—Part B*, vol. 19, No. 1, pp. 107–114, 1996.

Boisset, G.C. et al., "On–Die Diffractive Alignment Structures for Packaging of Microlens Arrays with 2–D Optoelectronic Device Arrays", *IEEE Photonics Technology Letters*, vol. 8, No. 7, pp. 918–920, Jul. 1996.

Cryan, C.V., "Two–dimensional multimode fibre array for optical interconnects", *IEEE Electronic Letters Online No.* 19980073, Oct. 23, 1997.

(List continued on next page.)

*Primary Examiner*—Khiem Nguyen
(74) *Attorney, Agent, or Firm*—Morgan & Finnegan LLP

(57) ABSTRACT

A female format connector, usable for connection with a male format connector having an alignment pin is described as having a high-precision piece coupled to a low precision piece. The low precision piece has an alignment opening dimensioned to accept the alignment pin of the male format device. The high-precision piece also has an alignment opening. The alignment openings are sized and positioned for accurate alignment between the pieces during coupling and, after coupling, the high-precision piece is modified such that the second alignment opening, after modification, is larger than it was prior to the coupling. A method of forming a female format ferrule involves coupling a high precision piece to a low precision piece, via alignment holes on each, the alignment holes are sized to accept a common alignment pin for maintaining accurate alignment between the pieces during coupling, and, after coupling, removing some of the alignment hole wall.

11 Claims, 29 Drawing Sheets

U.S. PATENT DOCUMENTS

| | | | |
|---|---|---|---|
| 5,379,361 A | 1/1995 | Maekawa et al. |
| 5,400,429 A | 3/1995 | Ames et al. |
| 5,446,815 A | 8/1995 | Ota et al. |
| 5,473,716 A | 12/1995 | Lebby et al. |
| 5,548,675 A | 8/1996 | Shigematsu et al. |
| 5,550,942 A | 8/1996 | Sheem |
| 5,579,426 A | 11/1996 | Li et al. |
| 5,613,024 A | 3/1997 | Shahid |
| 5,664,039 A | 9/1997 | Grinderslev et al. |
| 5,671,311 A | 9/1997 | Stillie et al. |
| 5,743,785 A | 4/1998 | Lundberg et al. |
| 5,761,350 A | 6/1998 | Koh |
| 5,815,621 A | 9/1998 | Sakai et al. |
| 5,853,626 A | 12/1998 | Kato |
| 6,012,856 A | 1/2000 | Kim et al. |
| 6,174,424 B1 | 1/2001 | Wach et al. |
| 6,238,100 B1 | 5/2001 | Sasaki et al. |
| 6,246,813 B1 | 6/2001 | Zheng |
| 6,292,529 B1 | 9/2001 | Marcovici et al. |
| 6,324,316 B1 | 11/2001 | Fouquet et al. |
| 6,328,482 B1 | 12/2001 | Jian |
| 6,379,053 B1 | 4/2002 | van Doorn |
| 6,442,306 B1 | 8/2002 | Dautartas et al. |
| 6,496,624 B1 | 12/2002 | Hikita et al. |
| 2001/0051026 A1 | 12/2001 | Steinberg et al. |
| 2002/0131752 A1 | 9/2002 | Boudreau et al. |
| 2002/0197047 A1 | 12/2002 | Basavanhally et al. |

OTHER PUBLICATIONS

Giboney, K.S., "Parallel–Optical Interconnect Development at HP Laboratories", *SPIE*, vol. 3005, pp. 193–201, Feb. 1997.

Hall, J.P. et al., "Packaging of VCSEL, MC–LED and Detector 2–D Arrays", Electronic Components and Technology Conference, pp. 778–782, 1998.

Hayashi T. and Tsunetsugu H, "Optical Module with MU Connector Interface Using Self-alignment Technique by Solder–bump Chip Bonding", Electronic Components and Technology Conference, p. 13–19, 1996.

Ishida, H. et al., "Two–dimensionally arranged 24–fiber optical connectors", *OFC '97 Technical Digest*, pp. 189–190, 1997.

Jöhnck M. et al., "8X* Pof Based Interchip Interconnection with 2.5 Gbit/s Per Channel Data Transmission", ECOC '98, pp. 35 and 36, Sep. 20–24, 1998.

Kosaka, M. et al., "Plastic–Based Receptacle–Type VCSEL–Array modules with One and Two Dimensions Fabricated using the self–Alignment Mounting Technique," IEEE Electronic Components and Technology Conference, pp. 382–390 (1997).

Koyabu, K. et al., "Fabrication of Two–Dimensional Fiber Arrays Using Microferrules", *IEEE*, pp. 11–19, 1998.

Lee, S.S., et al. "Self–Aligned Integration of 8×1 Micromachined Micro–Fresnel Lens Arrays And 8×1 Vertical Cavity Surface Emitting Laser Arrays For Free–Space Optical Interconnect", *IEEE*, pp. 31.2.1–31.2.4, 1994.

Liu, Yongsheng et al., "Design, implementation, and characterization of a hybrid optical interconnect for a four–stage free–space optical backplane demonstrator", *Applied Optics*, vol. 37, No. 14, pp. 2895–2911, May 10, 1998.

Maj, T. et al., "Interconnection of a two–dimensional array of vertical–cavity surface–emitting lasers to a receiver array by means of a fiber image guide", *Applied Optics*, vol. 39, No. 5, pp. 683–689, Feb. 10, 2000.

McCormick, F.B., "Smart Pixel Optics and Packaging", IEEE/LEOS Summer Topical Meeting: Smart Pickels, pp. 45 and 46, Aug. 1996.

Ohki, A. et al., "Multi–channel optical coupling between VCSEL arrays and multimode optical fibers for a 40–channel parallel optical interconnection module", *IEEE*, pp. 47 and 48, 1998.

G. Proudley, et al., "Fabrication of two dimensional fiber optic arrays for an optical crossbar switch," Optical Engineering, vol. 33, #2, pp. 627–635, Feb. 1994.

Sasian, J. et al., "Fabrication of fiber bundle arrays for free–space photonic switching systems", *Optical Engineer*, vol. 33, No. 9, pp. 2979–2985, Sep. 1994.

Söchtig, J. et al., "Replicated Plastic Optical Components for Optical Micro Systems", *IEEE*, pp. 37 and 38, 1998.

Tooley, F., "Challenges in Optically Interconnecting Electronics", *IEEE Journal Of Selected Topics In Quantum Electronics*, vol. 2, No. 1, pp. 3–13, Apr. 1996.

International Search Report dated Dec. 13, 2002.
International Search Report dated Dec. 17, 2002.
International Search Report dated Dec. 20, 2002.
International Search Report dated Jan. 2, 2003.
International Search Report dated Jan. 3, 2003.

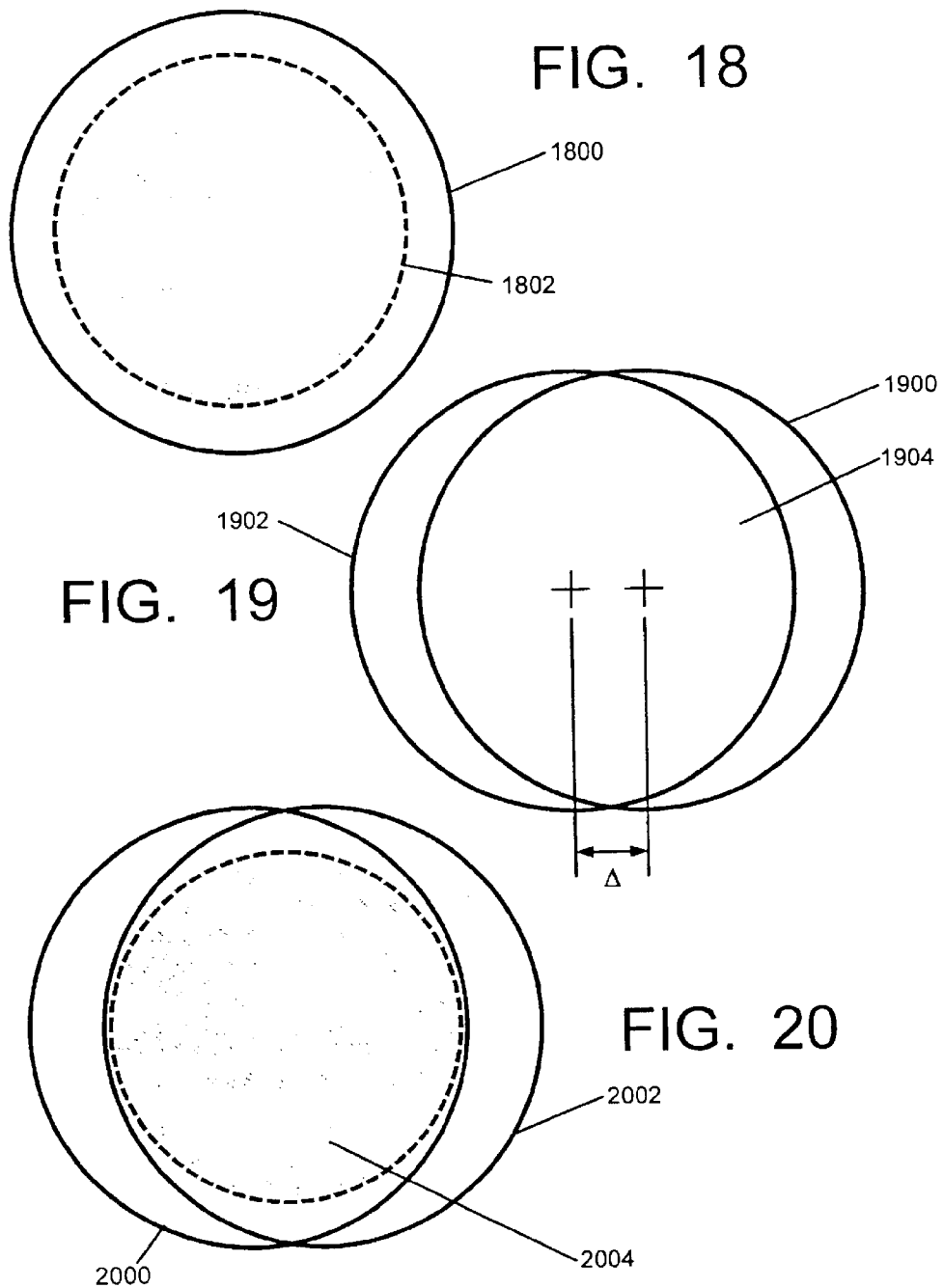

Top View
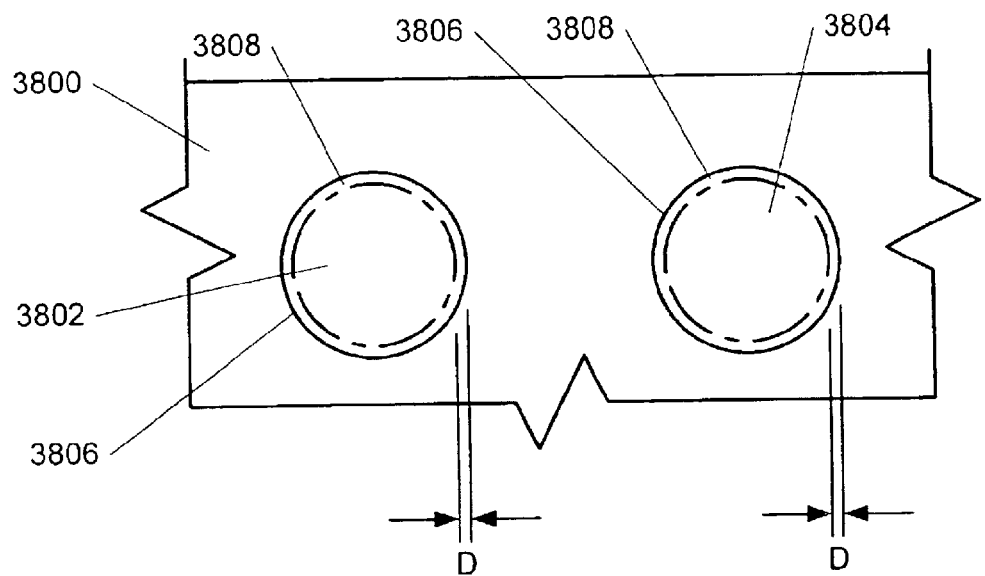
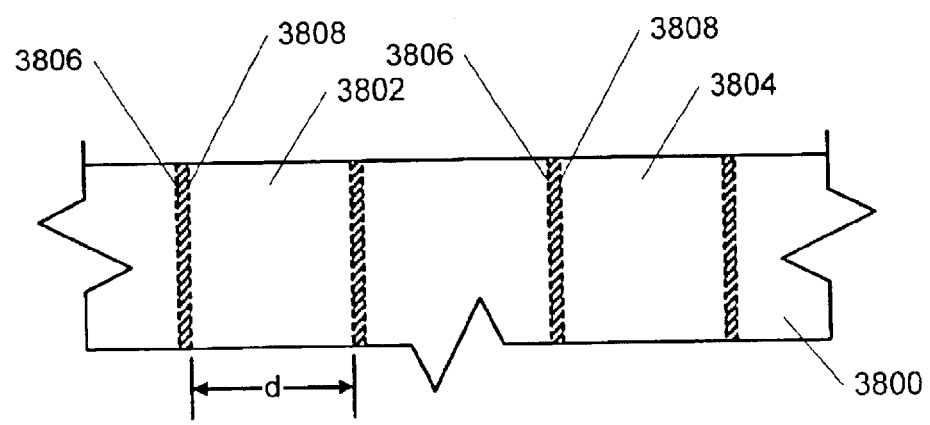
Side View
FIG. 38

A) Base wafer 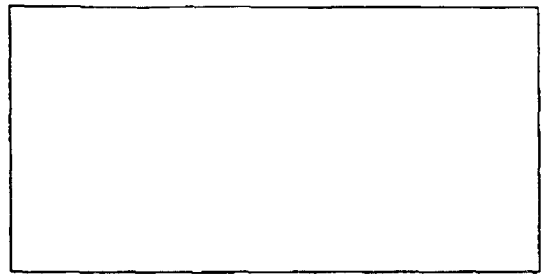
B) Holes (straight, angled, tapered, oval, etc.) made by etching, drilling, micromilling, etc. 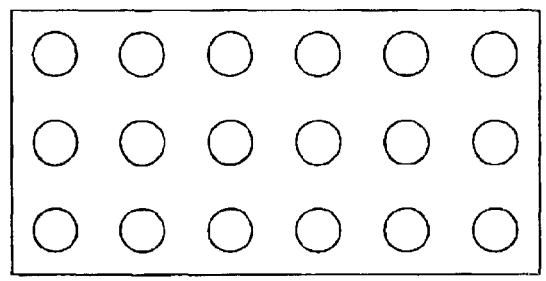
C) Treat with reactive gas to change into lower RI material as cladding (e.g. for Si, treat with steam at high temperature to oxidize Si to form $SiO_2$) 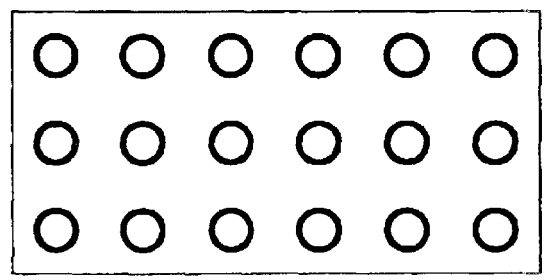
D) Fill holes with material with higher RI than cladding (e.g. polyimide) 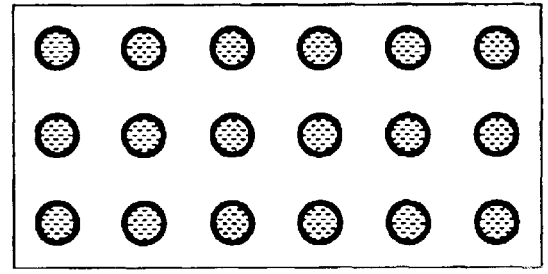
FIG. 40

HIGH-PRECISION FEMALE FORMAT MULTIFIBER CONNECTOR

CROSS REFERENCE TO RELATED APPLICATIONS

This application is a continuation of commonly assigned U.S. patent application Ser. No. 10/098,652, (now U.S. Pat. No. 6,609,835), Ser. No. 10/098,255 now U.S. Pat. No. 6,619,855 and Ser. No. 10/098,990 (now U.S. Pat. No. 6,629,780), all filed Mar. 14, 2002 which are continuations-in-part of commonly assigned U.S. patent application Nos. 09/896,513, 09/896,664, (now U.S. Pat. No. 6,773,166) Ser. No. 09/896,196 and 09/896,192, all filed Jun. 29, 2001 and which are all incorporated herein by reference in their entirety.

FIELD OF THE INVENTION

This invention relates to components and processes for fiber optic related component fabrication. More particularly, the invention relates to the fabrication of optical coupling and waveguiding elements.

BACKGROUND OF THE INVENTION

Optical Fibers in commercial systems have been traditionally held by using a combination of pieces.

A connector assembly 100, such as shown in FIG. 1 as an exploded view is used to attach various fiber pieces (or fiber pieces and modules) together. A ferrule 102 is the part of the connector 100 into which the fibers 104 themselves are inserted before the ferrule 102 is inserted into the overall connector itself. The ferrule 102 is a 'high-precision' piece of the assembly 100. It holds the fiber(s) 104 in a precise position and ensures that when two connector pieces are attached, that the fibers in the two pieces are held in accurate alignment. The remainder of the connector 106 is 'low precision' relative to the ferrule 102.

In the multi-fiber connectors available today, most of the connections are for fiber arrays of 2 or more fibers, such as shown in U.S. Pat. No. 5,214,730, up to arrays of 1×12 (although some commercial 2×12 configurations have been tried). The connectors employed are referred to by various names depending upon who makes them. In 1×2 arrays, connectors are referred to as ST, LC, MT-RJ connectors while for 1×12 arrays the connectors are referred to as MTP®, MPO, MPX and SMC connectors, among others. In the 1×12 or 2×12 area, all of the various connectors use a common type of ferrule commercially available from, among others, US Conec Ltd. and Alcoa Fujikura Ltd. In addition, commercial connectors for small arrays (less than 12) fibers have also been proposed, for example, in U.S. Pat. No. 5,743,785.

Fiber holding pieces, such as ferrules 102, can be made by molding plastic or epoxy pieces containing holes 108 into which optical fibers 104 can be inserted. Fibers must be able to be centered in each hole precisely and repeatably.

When an array of holes is made in a material for holding optical fibers, there are two aspects which need to be controlled. The spacing between holes (the "pitch" of the holes) and the diameter of each hole. Both have some margin of error due to the inherent inaccuracies of the fabrication techniques. If inaccuracies introduce errors in either (or both) pitch or size that are too large, then the fibers can be inserted at an angle or will not be positioned correctly in the ferrule. In either case, this negatively affects the ability to couple light efficiently, if at all, from one bundle to another or from an optical or opto-electronic component to a fiber bundle. If the hole pitch is inaccurate, then fibers from one bundle will not line up well with fibers of another bundle. However, even if the center-to-center pitch of the holes is very accurate, because the hole diameter is larger than the fiber (and each hole likely varies across an array) each fiber need not be in the exact same place in the hole as the other fibers in their holes, then that can cause misalignment, leading to inefficiencies or unacceptable losses. For example, if each of the holes in a ferrule piece was accurate to within 4 microns, then adjacent fibers could be off in pitch by up to 4 microns, since one fiber could be pushed to one side by 2 microns and the adjacent fiber could be pushed in the other direction by 2 microns. While this may be acceptable for multi-mode fibers, for single mode fibers this would be a huge offset that could make connections unacceptable or impossible.

In addition, fibers should generally not be placed in a hole at an angle or, if inserted at an angle, the particular angle should be specifically controlled.

FIG. 2 shows an example connector hole 200 and fiber 202. The inner circle, represents an actual fiber 202 while the outer circle, represents the hole 200 in the ferrule. As shown, the difference in sizes is not to scale but is exaggerated for purposes of illustration. Nevertheless, in actuality, the ferrule hole 200 must be larger than the fiber 202 by enough of a margin to allow for easy insertion—ultra-tight tolerances can not be effectively used. While the fiber 202 should ideally be centered with respect to the hole 200, as can be seen in FIG. 3, any individual fiber 202 could also be pushed in any hole 200 to somewhere else in the hole, for example, either the left or right edge (or any other edge) where it would not be centered within the hole 200. Thus, even if the ferrule has an accurate pitch "P" between hole centers 204, adjacent fibers 200 in an array may have an incorrect pitch "P+2ΔP" due to the offset ΔP between the center 206 of each hole 200 and where the fiber 200 lies within the hole 200, in this case, causing an incorrect pitch of P plus 2 times the individual offset ΔP in each hole.

The 1×12 and 2×12 ferrule technology currently in commercial use is based upon a glass filled epoxy resin (a high-performance plastic) which is fabricated using a common plastic molding technique called transfer molding. Today, ferrules molded out of epoxies or plastics can be made to the necessary tolerances for multimode fibers, but special care must be taken during fabrication. Plastic molding technology is very process sensitive and molds having the requisite precision are extremely difficult to make. Even so, yields tend to be poor due to the inherent manufacturing process errors that occur in plastics molding. Since the tolerances on these pieces must be very accurate (on the order of about 1 to 2 micrometers), high yield manufacture is difficult. As a result, the cost of terminating fiber bundles into these connectors can be quite expensive, running hundreds of dollars per side. In addition, the process is not scalable to larger numbers of fibers (particularly 30 or more) because of inaccuracies and yield issues associated with molding technology and reliable production of ferrules for similar numbers of single mode fibers is even more difficult.

There has been an increasing need among users in the fiberoptic field for larger groups of fibers, so demand for connectors to handle these groups has been increasing as well. As a result, creation of connectors for larger arrays, such as 5×12, have been attempted. One manufacturer is known to have made a 5×12 connector array, but achieved such poor yields that they deemed an array of that size unmanufacturable. Moreover, the cost of producing the pieces resulted in their being sold for $500 each, due to poor yield, and the mold for producing the pieces was destroyed during the process.

The problem is that in plastic molding pieces for holding higher fiber counts in small spaces results in less structural integrity for the molded piece. As such, the prior art has been forced to do without commercial connectors for such large arrays, because 5×12 arrays can not be reliably created and commercial connectors for larger format arrays (e.g. even a 6×12) are considered prohibitively difficult to even attempt.

The ferrule area is very small, since ferrules for the above MTP, MPO, MPX or SMC connectors are about 0.07" high, 0.3" wide and 0.4" deep, so molding or machining of features in the ferrules of the sizes required to hold multiple optical fibers (which typically have about a 125 micron diameter for a multimode fiber and a 9 micron diameter core for a single mode fiber) is very difficult. Since single mode fibers have an even smaller diameter than multimode fibers, molding or machining ferrules to accommodate large arrays of single mode fibers is currently, for all practical purposes, impossible—particularly on a cost effective commercially viable scale.

Additionally, making ferrules for arrays is made more difficult due to process variations during production because, as the holes approach the edge of the ferrule, the structural integrity of the walls decrease causing parts to have poor tolerance at the periphery, become overly fragile causing component collapse in some cases, or prohibiting removal of material from the inside of the piece that impedes or prevents fiber insertion.

Some have attempted to make two-dimensional fiber bundle arrays by creating a dense packing of fibers together, for example, as described in U.S. Pat. No. 5,473,716, and K. Koyabu, F. Ohira, T. Yamamoto, "Fabrication of Two-Dimensional Fiber Arrays Using Microferrules" IEEE Transactions on Components, Packaging and Manufacturing Technology—Part C, Vol 21, No 1, Jan. 1998. However, these attempts have not yielded a solution, particularly for the types of connectors mentioned above, because the inaccuracies of fiber production result in diameters of fibers which fluctuate within a 2 micron range (i.e. plus or minus 1 micron). Hence if 12 fibers are stacked in a row, there could be as much as 12 microns of inaccuracy in fiber alignment. Even with multi-mode fibers (the best of which use 50 micron cores), a misalignment of 12 microns will cause unacceptable light loss for most applications. For single mode fibers, which typically have 9 micron diameter cores, a 7 to 12 micron misalignment could mean that, irrespective of the alignment of the fiber at one end of the row, entire fibers at or near the other end of the row could receive no light whatsoever. For two-dimensional fiber arrays, the problem is even worse because the inaccuracy of the fiber is not limited to one direction. Thus, for example with a 16×16 array, a plus or minus 1 micron inaccuracy could result in fiber misalignments by up to 23 microns or more. Compounding the problem is the further fact that fiber inaccuracies stated as plus or minus 1 micron do not mean that fiber manufacturers guarantee that the fiber will be inaccurate by no more than 1 micron. Rather, the inaccuracy statement represents a standard deviation error range. This means that most of the fiber should only be that inaccurate. Individual fibers, or portions thereof, could have larger inaccuracies due to statistical variations.

As a result, the larger the number of fibers, the more likely a problem due to fiber inaccuracy will occur because, for example, using the 16×16 array above, the array would have 256 times the chance (because there are 16×16=256 fibers) of having at least one of these statistically anomalous fibers in the group.

Others have attempted to align two dimensional arrays of fibers (e.g. 4×4 arrays) in a research setting, but none have applied their techniques to conventional connector technologies. Moreover, the techniques are not suitable or readily adaptable for high yield, low cost, mass production as demanded by the industry. For example, some groups have examined the use of micromachined pieces made out of polyimide as described in J. Sasian, R. Novotny, M. Beckman, S. Walker, M. Wojcik, S. Hinterlong, "Fabrication of fiber bundle arrays for free-space photonic switching systems," Optical Engineering, Vol 33, #9 pp. 2979–2985 September 1994.

Others have attempted to use silicon as a ferrule for precisely holding fiber bundle arrays since silicon can be manufactured with very high precision (better than 1 micron) and techniques for processing of silicon for high yield is, in general, well understood.

Early attempts at silicon machining for two-dimensional array fiber placement were performed with some limited success and one-dimensional fiber arrays, using fibers placed in V-Grooves etched into a piece of silicon, have been created, for example, as shown in FIG. 4A. The approach used the silicon pieces to hold the fibers but no attempt was made to integrate such an arrangement into a commercial connector.

Other groups took the V-Groove approach of FIG. 4A and performed an experiment where they stacked two of pieces together FIG. 4B for insertion into a connector. This resulted in a minimal array with two rows of fibers, as described in H. Kosaka, M. Kajita, M. Yamada, Y. Sugimoto, "Plastic-Based Receptacle-Type VCSEL-Array modules with One and Two Dimensions Fabricated using the self-Alignment Mounting Technique," IEEE Electronic Components and Technology Conference, pp. 382–390 (1997), but the technique was not scalable to larger format two-dimensional arrays, such as shown in FIG. 4C.

Still other groups looked at holding larger format two-dimensional arrays using silicon pieces machined using wet-etching techniques, as described in G. Proudley, C. Stace, H. White, "Fabrication of two dimensional fiber optic arrays for an optical crossbar switch," Optical Engineering, Vol 33, #2, pp. 627–635, February 1994.

While these silicon pieces were able to hold fibers, they were not designed to be, and could not readily be, used with existing ferrule or connector technology. Moreover, they could not be used for single mode fibers with any accuracy.

Thus, none of the above attempts have provided a viable solution to the problem of how to effectively create a large format fiber array which: allows for high precision holding of large arrays of fibers, especially single mode fibers, is compatible with current commercially used connectors that attach two fiber bundles to each other or one fiber bundle to a component containing an array of optical devices, such as lasers and/or detectors, and that allows for easy fiber termination in a rapid fashion at low production cost.

In addition, because of the above problems, there is presently no large format ferrule apparatus that can maintain fibers at a low angle, or at a precisely specified angle, for good optical coupling.

Collimating arrays are conceptually arrays of pipes for light. Mass production of collimating arrays for commercial applications has largely been dominated by the digital photographic camera and digital video camera world. These applications typically use a device called a "faceplate", which is a multi-fiber assembly used to direct light onto optical detectors used for imaging. Since, for cameras, effective imaging requires the maximum amount of light reach the detectors, a faceplate will have several fibers per individual detector. In fact, in the most desirable faceplates, the number of optical fibers exceeds the number of optical detectors by many times. Thus, light being directed to a single detector in such a camera passes through multiple optical fibers arranged in parallel, and a camera has one detector per pixel. For imaging systems like cameras, this collimating technique is sufficient to accomplish its purpose. However, when dealing with optical communication systems, faceplates can not be used because the light loss resulting from such a collimating arrangement is significant. The faceplate technique (sometimes also referred to as oversampling) is also incompatible with the use of single mode fibers or lasers (which are highly desirable for use in high speed, long distance data transmission). Hence, the collimating technique of using a faceplate, such as made for use in cameras, is an unworkable approach for opto-electronic communication devices.

As noted above, for one-dimensional optical device arrays, attempts have been made to create collimators by using a piece of silicon wafer, into which V-Grooves are etched, and laying the fibers into the V-Grooves as shown in FIG. 4A. This is an operational approach for forming a one-dimensional array that is unsuitable for mass production.

Other groups have attempted to stack multiple V-Groove arrays on top of one another (FIGS. 4b, 4c) to create a larger collimating element. Unfortunately, the accuracy of stacking in the second dimension is limited by the accuracy of the thickness of the individual wafers, both on an absolute basis and on a relative basis, due to thickness variations over the area of the wafer. In addition, the stacked V-Groove technique requires such accuracy that individual stacks must be individually built up one at a time; a costly and inefficient process.

Similarly, optical waveguides are also conceptually pipes for light. Presently, there are also no inexpensive two dimensional optical waveguide combiners available for commercial applications or that can be used with a fiber array. In some cases, optical fibers are twist fused to form a 2 to 1 "Y" branch, for example, for coupling a pumping laser to a single, signal carrying, fiber. For one-dimensional arrays of devices, Y branches have been created on the surface of a wafer by patterning, using lithographic techniques, to form waveguides. This technique provides robust control for a one-dimensional array, but cannot be extended into two dimensions since it is inherently a planar process.

Other methods for making structures for guiding light center around a field known as "photonic integrated circuits" and approaches for making them fall into three general classes.

The first class, shown in FIG. 31, involves patterning waveguides 3102 on top of a substrate 3104. By way of example, the waveguides 3102 can be polyimide and the substrate 3104, glass. The problem with this approach is that it is not applicable for 2-dimensional array formatting since the intended height of the waveguides 3102 can be as much as 30 microns, but must have sub-micron tolerance and uniformity across the substrate 3104. For mass production, this typically means across an 8 inch or larger wafer. Obtaining this level of accuracy is prohibitive if not impossible to achieve for waveguides 3102 patterned above the substrate 3104.

The second class, shown in FIG. 32, involves defining waveguides 3202 within a substrate 3204 using an implant or irradiation technique to change the refractive index of the substrate 3204 in various regions. The problem with this approach is that the typical refractive index change between the implanted or irradiated region is a gradient that is so small relative to the substrate that unacceptable levels of light leakage can occur at bends, turns or tapers in the structure. Thus, this approach is poorly suited for waveguides that are not straight.

A hybrid approach, shown in FIG. 33, using a combination of the first and second class approaches, defines regions 3302 in the substrate 3304 by implant or irradiation and uses pattern etches 3306 on top to bound the light. However, the same loss problems typical of the second class of processes occur. In addition, most substrates that would be used in an etch process, such as in the first and hybrid approaches, are glasses or crystals which are difficult to etch to significant depths, for example, 30 microns or more, with an accuracy of 1 micron or less.

A third class uses voltage to define waveguides. However, this class similarly has problems typical of those occurring with the second class of processes. In addition, this class has the further disadvantage of requiring the application of electric power to define the regions, which is highly undesirable.

In addition, whatever form of waveguide, collimator or coupler is used, if such devices are used in connectors, they must be able to withstand the stresses of repeated connecting to and disconnecting from a mating part without incurring damage or detrimentally affecting the accurate fiber alignment necessary for proper operation.

Thus, there remains a need in the art for high accuracy, low loss waveguides or couplers that can be manufactured on a commercial production scale and can stand up to repeated connectorization.

SUMMARY OF THE INVENTION

We have created a processing and fabrication technique for multi-piece ferrule technology that satisfies the different needs in the art. With our approach, a female format high-precision ferrule piece used in a female side of a device or connector is modified so that alignment pins (also referred to as guide pins) from a male format component, with which the female side will mate, do not damage the high precision piece.

By applying the teachings herein, fabrication of optical coupling and waveguiding elements according to a simple, but highly accurate, processing scheme is made possible. Moreover, these optical coupling and waveguiding elements exhibit extremely low loss of light through the structures, particularly where the light path includes bends, turns or tapers.

Advantageously, the technique is scalable, permitting concurrent manufacturing of multiple such devices on individual wafers, irrespective of wafer diameter, the only limitations being the number and size of the devices that will fit within a wafer's area and/or the number of wafers that can be concurrently etched and/or oxidized. Such limitations however, are independent of the invention.

By using our approach, optical coupling and waveguiding elements can be made at a lower material cost, in a highly accurate manner, on a production scale previously unavailable, and in a manner that is not overly labor intensive.

Moreover, the technique allows the creation of optical elements that provide additional benefits because they can be fit into a connector, may or may not hold optical fibers, and can add a third dimension of freedom. This enables the construction of not only fiber holding elements, but also collimator arrays, Y branch, two-dimensional waveguides, and three-dimensional optical integrated circuits.

One aspect of the invention involves a female format connector, usable for connection with a male format connector having at least one alignment pin. The female format connector has a housing, a ferrule, contained within the housing, comprising at least one high-precision piece coupled to a low precision piece. The low precision piece has a first alignment opening dimensioned to accept the alignment pin of the male format device. Prior to being coupled to the low precision piece, the at least one high-precision piece has multiple fiber holes and a second alignment opening. The first and second alignment openings are sized and positioned to provide accurate alignment between the high-precision piece and the low precision piece during coupling of the high-precision piece and the low precision piece to each other. After coupling, the high-precision piece is modified such that the second alignment opening after modification is larger than the second alignment opening prior to the coupling.

Another aspect of the invention involves a female format connector, usable for connection with a male format connector having at least one alignment pin. The female format connector has a housing, a ferrule, contained within the housing, comprising at least one high-precision piece coupled to a low precision piece. The low precision piece has a first alignment opening dimensioned to accept the alignment pin of the male format device. Prior to being coupled to the low precision piece, the at least one high-precision piece comprises multiple fiber holes and a wall surface defining a second alignment opening. The first and second alignment openings are sized and positioned to provide accurate alignment between the high-precision piece and the low precision piece during coupling of the high-precision piece and the low precision piece to each other. After coupling, a portion of the high precision piece is removed.

A further aspect of the invention involves a method of forming a female format ferrule involves coupling a high precision piece, having a first wall defining a first alignment hole, to a low precision piece, having a second alignment hole, the first and second alignment holes being sized to accept a common alignment pin for maintaining accurate alignment between the high precision piece and the low precision piece during the coupling, and after the coupling, removing at least some of the first wall.

These and other aspects described herein, or resulting from the using teachings contained herein, provide advantages and benefits over the prior art. For example, one or more of the many implementations of the inventions may achieve one or more of the following advantages or provide the resultant benefits of: longevity through repeated connectorizations, ease of insertion into a large format ferrule, high yield, low cost assembly, high precision, design scalability, application scalability, integration into standard commercial connectors, compatibility with commercial connector through-hole pin-placement, manufacturability in a mass-production wafer scale process, compatibility with the thermal coefficient of expansion of silicon chips used for transmission and reception of data, lower material cost, lower labor cost, high two- and three-dimensional accuracy (since etches can be placed with lithographic precision and oxidation further increases this precision), pieces can be stacked arbitrarily and/or large numbers to make waveguides which change in two- or three dimensions along their length, collimated couplers, optical routers, etc . . . , individual wafer thickness is irrelevant, so cheaper, less controlled material can be used, stacking on a wafer basis rather than on a piece basis to allow for integration on a massive scale.

Additional advantages achievable in some variants include: the ability to easily create highly accurate two-dimensional and three-dimensional light directing structures inexpensively, through the use of commercially available silicon wafers, since silicon wafers of exacting thickness are widely available; ease of manufacture, since patterning and etching of silicon can be accomplished to very accurate sizes and depths; wafer scale manufacturability, because the processes used are all compatible with current wafer scale fabrication techniques; and, creation of very high-confinement optical structures, having smooth sidewalls of a highly uniform, extremely controllable refractive index material, so that almost all light entering the resultant guide structure will be transmitted through it.

The advantages and features described herein are a few of the many advantages and features available from representative embodiments and are presented only to assist in understanding the invention. It should be understood that they are not to be considered limitations on the invention as defined by the claims, or limitations on equivalents to the claims. For instance, some of these advantages are mutually contradictory, in that they cannot be simultaneously present in a single embodiment. Similarly, some advantages are applicable to one aspect of the invention, and inapplicable to others. Thus, this summary of features and advantages should not be considered dispositive in determining equivalence. Additional features and advantages of the invention will become apparent in the following description, from the drawings, and from the claims.

BRIEF DESCRIPTION OF THE DRAWINGS

FIG. 18 shows one hole for a high-precision piece superimposed over an optical fiber;

FIG. 19 shows two fiber holes of the same size as in FIG. 18 on different high precision pieces according to a variant of the invention;

FIG. 20 shows the holes of FIG. 19 holding the optical fiber of FIG. 18 where the offset is equally divided between both pieces;

FIG. 38 is a top and side view of a portion of a wafer where the openings of holes have been reduced by plating, or treatment with a reactive gas;

FIG. 40 is an example of the through-hole format light guiding structures;

DETAILED DESCRIPTION

Overview

In overview, the technique uses one or more high-precision pieces that can be combined with a low precision piece to form a ferrule-like unit and then integrated into a commercial connector as the ferrule the connector is designed to receive.

Low Precision Piece Creation

Figure 5:
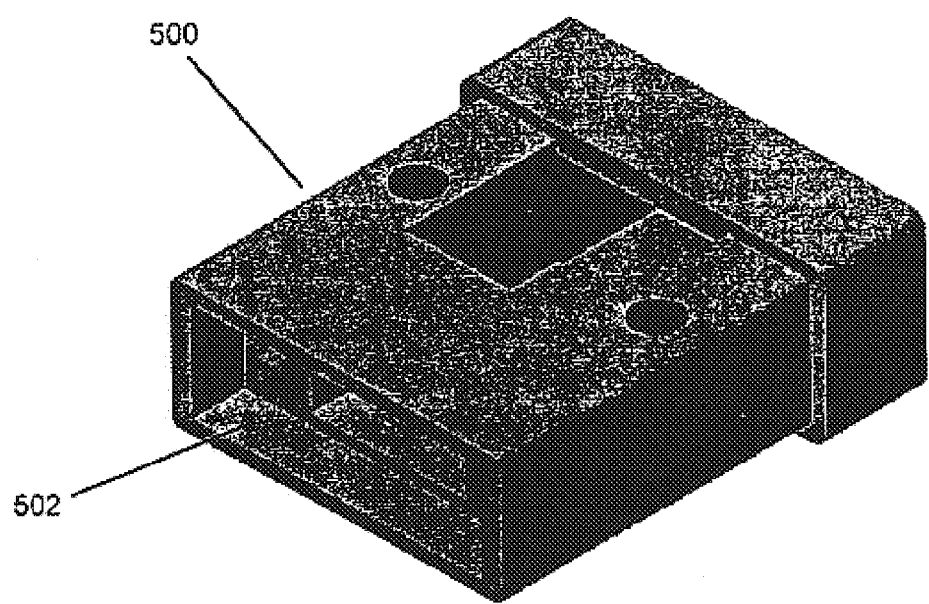
FIG. 5 shows an example of a low-precision piece in accordance with the invention.

An example of a low-precision piece 500 is shown in FIG. 5. As shown, this particular shape piece is designed in the shape of a ferrule opening in an industry standard connector apparatus so it can be inserted into a commercial connector, for example, in place of the ferrule 102 of FIG. 1. In practice, this currently means the piece should typically be shaped to dimensionally fit into at least one of an MTP or MPO or MPX or SMC style connector. Depending upon the particular variant, the low-precision piece 500 is manufactured by, for example, a polymer molding technique, for example, injection molding, transfer molding, or by some other molding, milling or forming technique. In some variants, the material used for injection molding is a glass filled epoxy, although other epoxies or plastics can be used. Alternatively, in other variants, the material is either metal or some other moldable or millable material.

The low-precision piece is manufactured to the outer dimensions to allow it to be properly inserted into the desired connector. In addition, it typically has an opening 502 that is large enough to receive the high precision piece(s).

Figure 6:
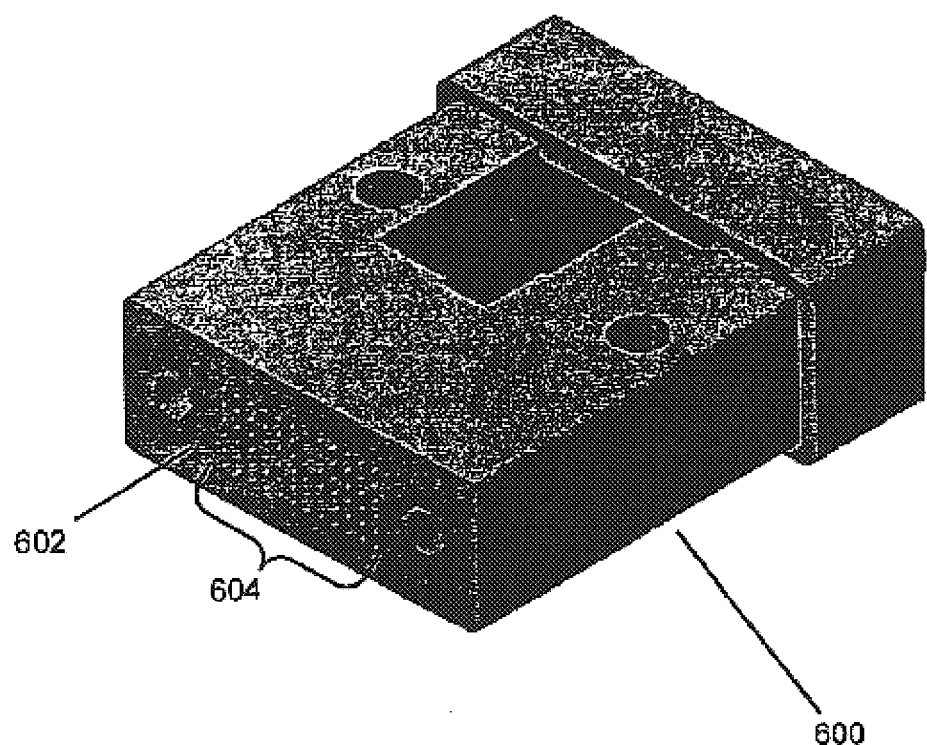
FIG. 6 shows an example of a low-precision piece that is also part high precision piece.

In some variants, the "low precision" piece may also be, in part, a high precision piece, for example, as shown in FIG. 6, if the low precision piece 600 is made out of metal and has a thin face 602 that can be processed with holes 604 as described below. However, it is expected that such variants will lack many of the advantages of using separate low- and high precision pieces, but may achieve other advantages or benefits due to the particular application it is being used for or in.

High Precision Piece(s) Creation

By way of representative example, the technique for creating the high-precision piece(s) will now be described using a wafer of silicon as the starting point.

While in some variants, silicon is used as the starting material for forming the high-precision piece(s), in other variants, materials such as quartz, sapphire, ceramics, glass, other insulators, other semiconductor wafer compounds, polymers such as polyimide, or metals, such as aluminum or tungsten or alloys, can be used.

The overall manufacturing process for the high-precision piece(s) proceeds as follows:

a) The wafer is processed into a series of chips by etching holes through the wafer using either an etching or drilling process. In some variants, this is done through a semiconductor lithography process combined with an etching technique. In other variants, laser drilling is used. The holes are each of specific sizes and, where appropriate, axially offset at a specific angle relative to the plane of the wafer (or piece once cleaved). Features such as holes for alignment pins or bumps and recesses for precision mating are also created, where appropriate. The wafer contains many copies gf the chips that will be needed to make a particular high precision piece, for example, fiber holding piece, a collimator, many-to-one taper or Y branch. The pieces to build up an element of a particular type can be processed on a single wafer or by making several wafers, each having some of the pieces needed to make the component. In either case, the resultant wafer scale batch processing is the same and saves costs.

The holes are classified into two groups: those which are made for fiber insertion and/or receiving an optical epoxy, and those that are for alignment and/or placement into a connector. Although in the ideal case, the holes are perfectly cylindrical, frustoconical, obconic or funnel shaped, in practice the holes may only be substantially cylindrical, frustoconical or funnel shaped. However, those deviations, for purposes of the processes described herein, are considered negligible since they are either a) much smaller than the optical fiber diameter and hence have no meaningful effect on placement or performance in the case of fiber holding embodiments, or (b) virtually irrelevant in the case of waveguide embodiments.

In addition, for the variants described herein, to facilitate fiber placement or create certain waveguide arrangements, in some cases it may be desirable to intentionally use cylindrical, frustoconical, obconic or funnel shaped holes that have a substantially oval, substantially egg shaped or substantially elliptical cross section perpendicular to their axes (i.e. they are not round). In other variants, different shaped grooves or grooves in some combination with holes are used.

Figure 7:
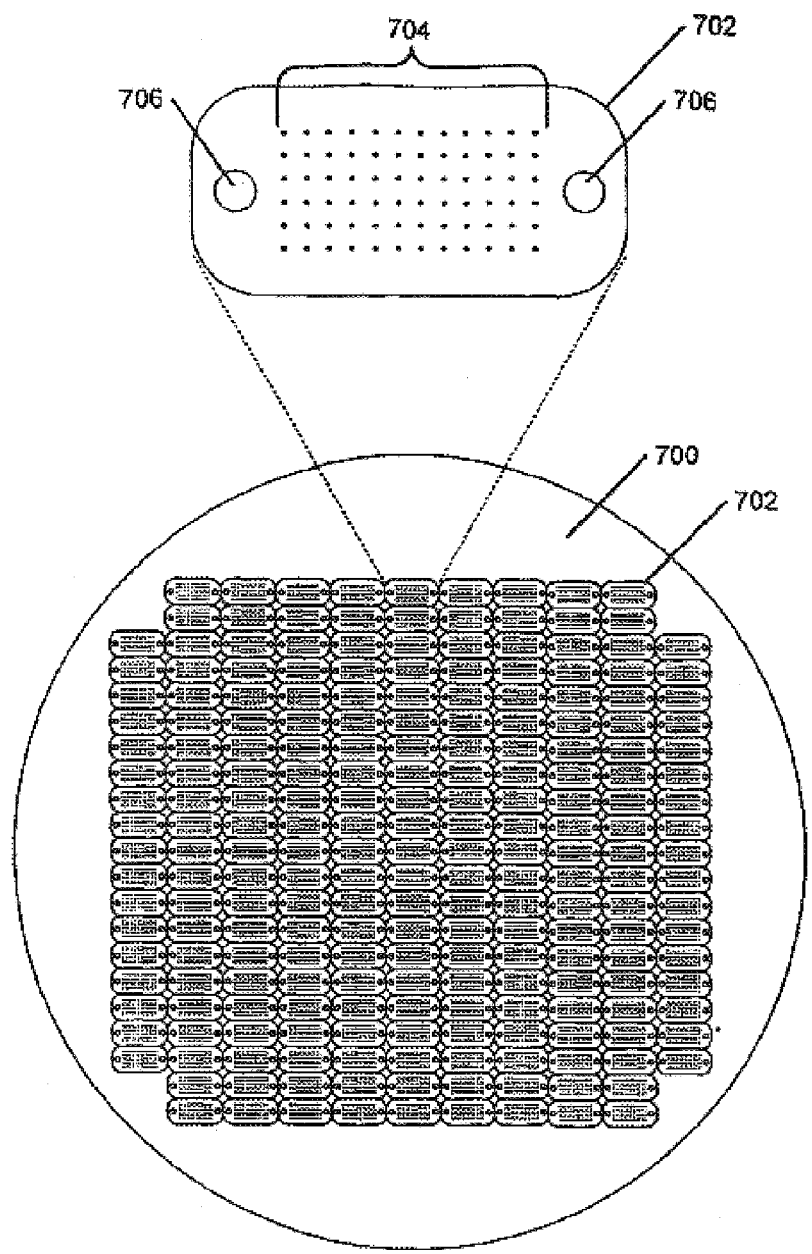
FIG. 7 shows an example wafer created using one variant of the technique described herein.

FIG. 7 shows an example wafer 700 created using one variant of the technique described herein. Each piece 702 (also called a slice) contains a central group of small holes 704 (in this case 72 per piece) for fibers and larger holes 706 on the left and right sides of each piece for alignment of the piece relative to some other piece. Typically, the number of holes will be equal to or some multiple of the number of fibers in a commercial optical fiber bundle, for example, bundles of 6, 12, 24, 36, 48, 60, 72, 84, 96, 108, 120, 132 or 144 fibers.

Figure 8:
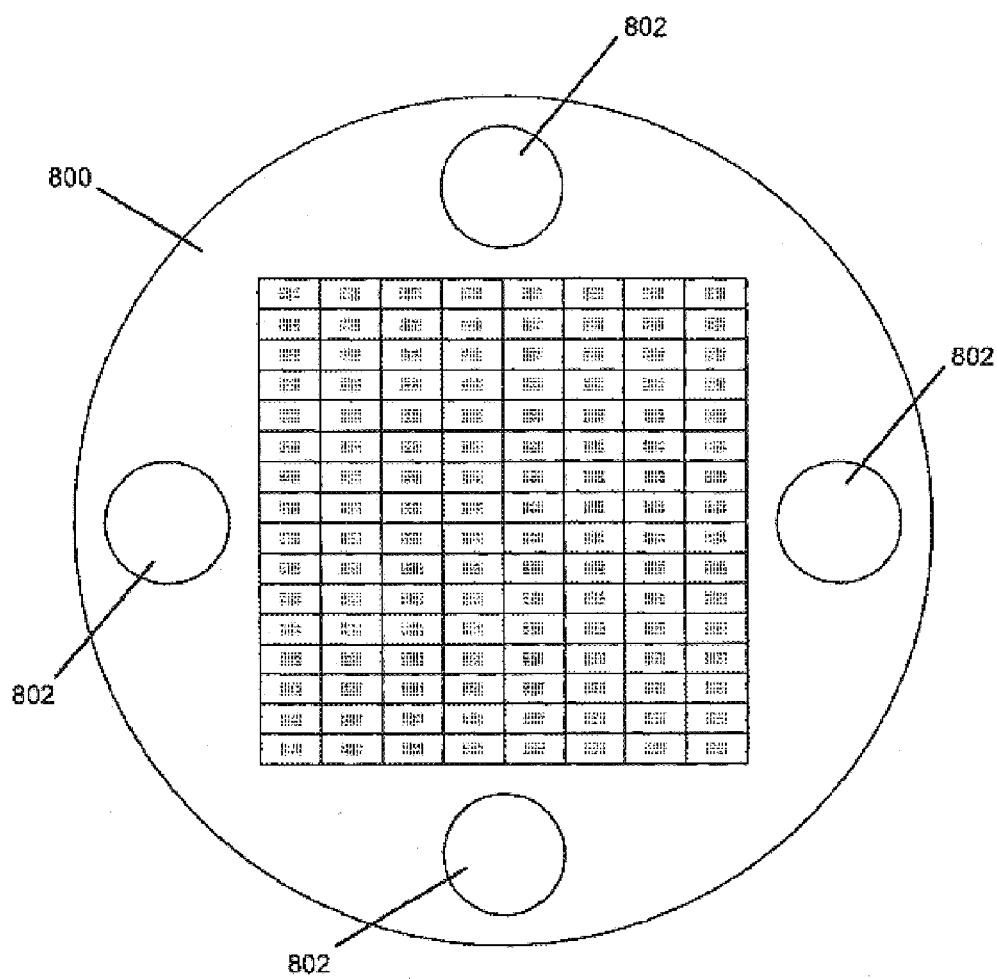
FIG. 8, shows a silicon wafer created using another variant of the technique described herein.

FIG. 8, shows a silicon wafer 800 created using another variant of the technique described herein. As shown in FIG. 8, there are small holes 802 in each piece 804 within the central area of the wafer for fibers or optical epoxy and large holes 806 near the edge of the silicon wafer for alignment on a wafer basis.

Figure 1:
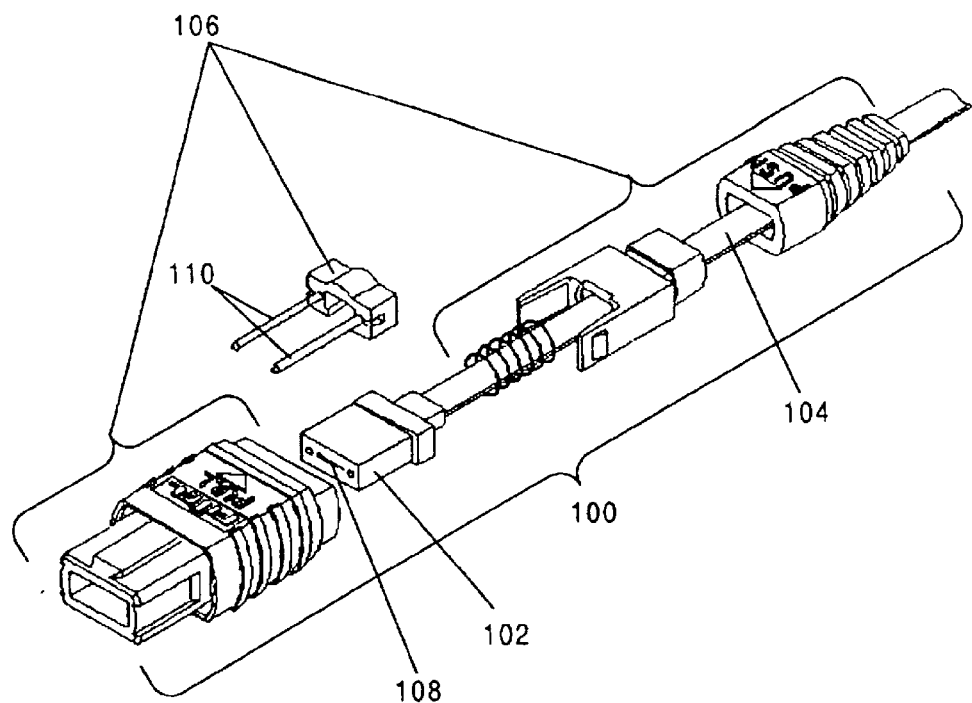
FIG. 1 shows an exploded view of a commercial connector assembly.
Figure 2:
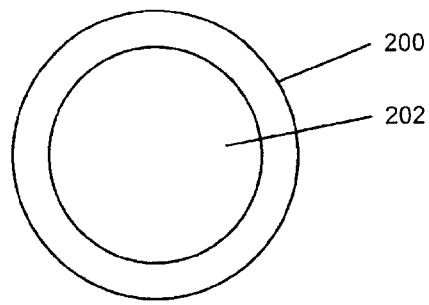
FIG. 2 shows an example connector hole and fiber.
Figure 3:
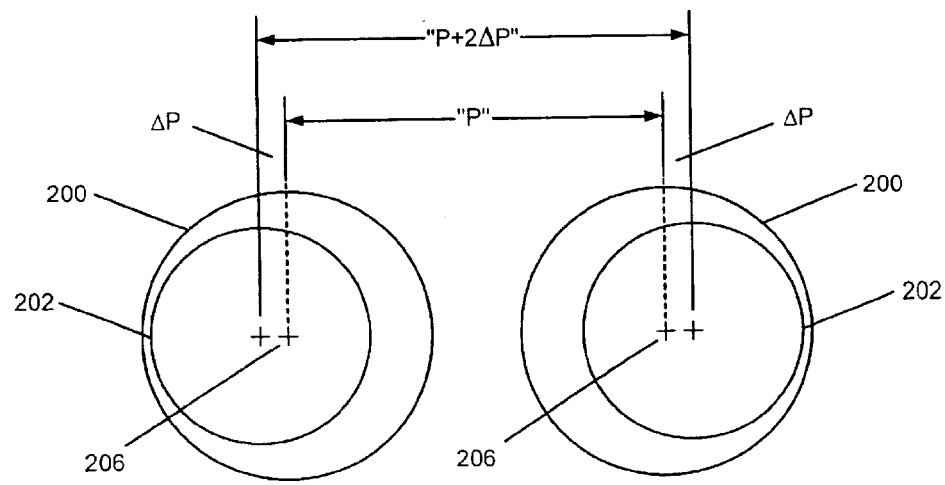
FIG. 3 shows fibers not centered within holes of FIG. 2.
Figure 4A:
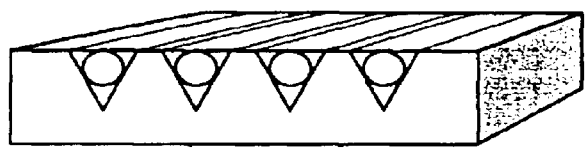
FIG. 4A shows a one-dimensional fiber array having fibers placed in V-Grooves etched into a piece of silicon.
Figure 4B:
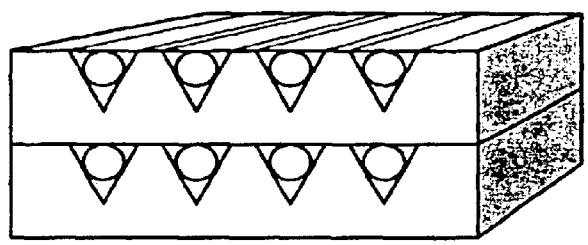
FIG. 4B shows a stack of two one-dimensional fiber arrays of FIG. 4A.
Figure 4C:
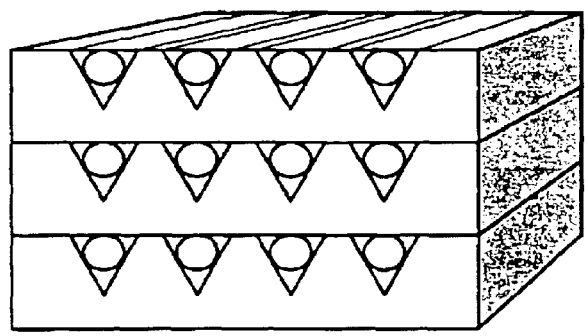
FIG. 4C shows a hypothetical large format stack of three one-dimensional fiber arrays of FIG. 4A.

Additionally, or alternatively, the alignment holes can be part of each piece and specifically be spaced so that the piece may be inserted into an MTP, MPO, MPX, or SMC or other widely available style commercial connector, such as shown in FIG. 1, as part of or in place of a ferrule and also aligned using alignment pins 110 that are on a part 112 of the connector itself.

Additionally, other holes or features may be etched into the piece to allow the insertion of epoxies, solder, or some other fastening agent to hold the piece to the low precision piece or so that two or more of the pieces can interlock with each other.

Depending upon the particular variant, in some cases, one or more of the alignment holes on one or more of the components may optionally have an oblong or oval shape to allow some freedom of movement.

Depending upon the particular variant, the particular grooves or holes may have straight or tapered sidewalls.

In some variants using straight holes, the holes are created by laser drilling. In other variants, the straight holes are formed using an etching process, for example, anisotropic hole etching. By way of example, for a silicon wafer, anisotropic deep/via hole etching of silicon is performed by photoresist patterning the wafer according to the desired hole placement and etching using the Bosch process in a high-density plasma reactor such as either an electron cyclotron resonance (ECR) or inductively coupled plasma (ICP) reactor. The Bosch process is based off of a time multiplexing scheme separating the etch (SF6) and passivation (C4F8 sidewall protection) cycles. The etch causes scalloping on the silicon sidewalls and sharp edges at the base of the via but the profile produces nice straight holes/vias. Since the scalloping creates edges that are too sharp for fiber insertion without a guiding structure to help the fiber avoid the edges at the base of the structure, clean-up etching is required.

Both the clean up etching process and the process of creating tapered holes is essentially the same. In addition to the Bosch process, for clean up and creating tapered holes, an isotropic (non-directional) silicon wet etch ($HF:HNO_3$, 1:1) is used. This produces smooth, damage free tapered surfaces. In addition, the isotropic wet etch eliminates and/or reduces the scalloping and sharp edges created from the Bosch process, making fiber insertion easier and more reliable.

Alternatively, holes/vias can be made with a combination of etching with KOH and the Bosch process. Both KOH etching and Bosch process etching are well understood and used widely. Etching of silicon using KOH is also well known and is used in the micro-machining industry and the micro electro mechanical systems (MEMS) area.

In the alternative variants, a Bosch etch is used on the front side of the (100) silicon wafer. Then a $SiN_X$ stop layer for the KOH is deposited in the Bosch etched front side hole. The back side of the wafer in then photoresist patterned in alignment with the front side of the silicon wafer. The back side is then wet etched with KOH. The $SiN_X$ is then removed. The scalloping and sharp edges are then smoothed with $HF:HNO_3$, (1:1). This process produces a via hole that is both sloped and anisotropic with a sidewall profile that facilitates fiber insertion.

The process is similar to create the pieces using other materials except, the specific etch process used will differ based upon the particular material being used. Since techniques for etching and/or drilling of holes in other materials such as ceramics, glass, other insulators, other semiconductor wafer compounds, polymers such as polyimide, or metals, such as aluminum or tungsten or alloys are all presently known and can be applied in a straightforward manner based upon the teachings contained herein, the specific details of performing similar/analogous operations, on the other materials, are omitted for brevity.

In addition, by optionally orienting the wafer during the etching process and using a dry etching processes, it is possible to etch the holes in a preferred direction or at a specified angle. This is desirable since a controlled angled insertion allows higher efficiency coupling into single mode fibers (i.e. non-tapered holes can be etched at a specified angle, for example, an angle up to about 8 degrees with respect to a perpendicular to the wafer surface, and thus allow inserted fibers to be accurately held precisely at the specified angle). This allows a ferrule for single mode fiber to be easily and inexpensively created.

b) Depending upon the wafer material's refractive index, the wafer and/or the holes or grooves can optionally be coated with a thin layer of metal deposited, for example, by such techniques as sputtering, evaporation, electroplating or electroless plating or can be treated with a reactive gas to cause the wafer material to create a coating of reacted wafer material on the exposed surface that reduces the index of refraction and/or allows for hole size optimization, for example, in the case of a silicon wafer, treating with steam at high temperature causes the surface to oxidize into silicon dioxide. In addition, the oxidation process reduces the hole size in a very even, precise and controllable manner as the material is oxidized over time.

c) Portions of the wafer may also optionally have a dielectric, solder or other adhesive deposited on it, for example, by surrounding some of the holes with a ring of reflowable solder a few microns thick or using deposition techniques such as sputter deposition.

d) In some variants, the wafer is then diced into individual pieces. In other variants, for example, in a batch manufacturing process, the wafer may not be diced until after any of e), f), g), h) or i) below depending upon the particular wafer, type of arrangement being created or other manufacturing reasons irrelevant to understanding the invention.

e) The wafers or individual wafer pieces are stacked onto alignment pins.

Figure 9:
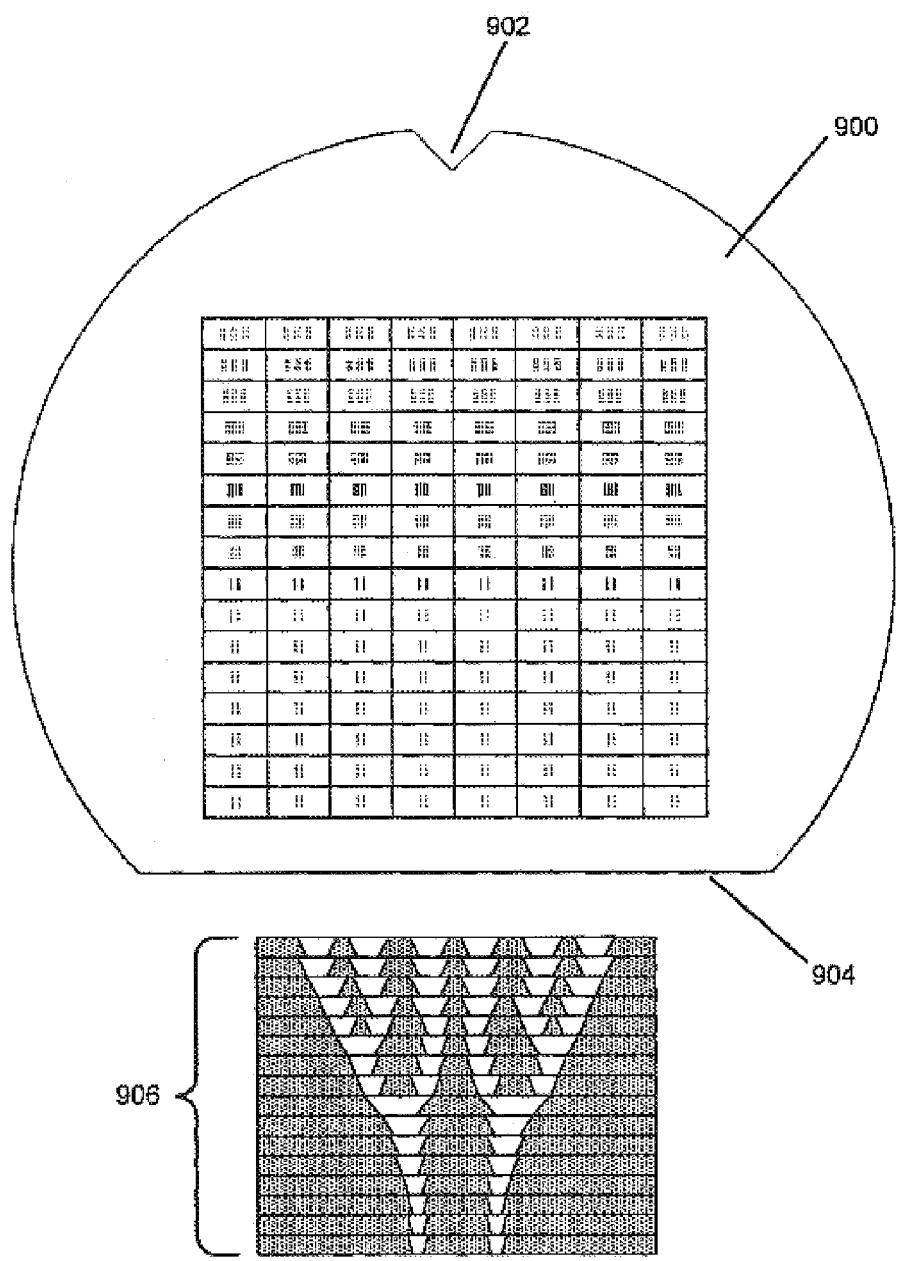
FIG. 9 shows a silicon wafer created using another variant of the technique described herein having a feature for accurate alignment of the wafer relative to another wafer and/or holding of the wafer.

Depending upon the particular application differing methods will be used for alignment, for example, holes 802 can be placed for alignment on a wafer basis (as shown in FIG. 8), rather than on an individual piece basis. Alternatively, instead of using alignment pins, on a wafer of piece basis, a wafer 900 can have some other feature, for example, a notch 902 and/or flattened portion 904 such as shown in FIG. 9 for accurate alignment and/or holding of the wafer. In some variants, other techniques for alignment can be used, such as, putting the pieces into a holding jig or using interlocking complementary features etched into each piece.

f) The wafers or individual wafer pieces are then fused together, for example, by heating and melting the solder, which fuses the pieces together, or by using other bonding techniques including, those using pressure, adhesives or mechanical devices such as clips, screws or rivets.

g) Optionally, if the holes will not directly hold fibers or hold an element like a microlens or diffraction grating, optical epoxy and/or dielectric material(s) are flowed and/or sputtered into the holes and, in the case of epoxy, cured to harden it.

h) The alignment pins are optionally removed, and i) The end faces of the piece are polished to optical quality.

The final piece can also be ground down, prior to, or after, step i), to any specific final shape desired, since the shape of the high-precision piece as it goes into the low precision piece can be different from the shape after the pins are removed or the pieces are diced.

It should be noted that the above steps need not be performed in precisely the order specified. Since the various permutations and combinations are to numerous to detail, it should be understood that, in some cases, the order can be changed without changing the invention.

Some example variants use a wafer-at-a-time process for creating the high-precision pieces in bulk. By making the pieces in wafer form, large numbers of pieces can be made simultaneously, thus keeping the costs down. As shown in FIG. 7 over 220 pieces can be made on a single wafer at one time. Typically, if an industry standard four inch wafer is used, over 400 pieces for an MTP connector ferrule can be made per wafer. Using an eight inch wafer, allows production of three to four times that number.

Connector Creation

The connector is created by combining the high precision piece(s), the low-precision pieces, inserting the fibers, and incorporating the combined piece into the remainder of the connector.

Figure 10A:
FIG. 10A shows an example high precision piece made using one variant of the technique described herein.
Figure 11:
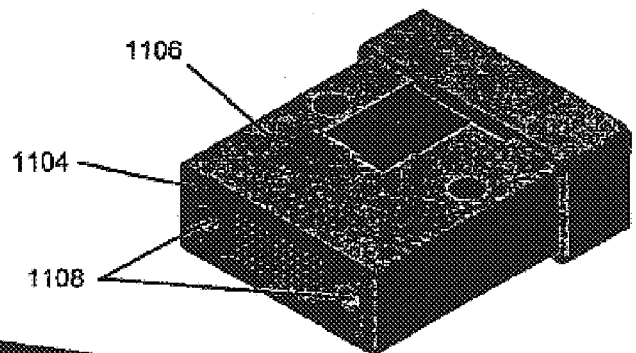
FIG. 11 shows a high-precision piece set up to mount flush on a face of a low-precision piece.

The high precision piece(s) are inserted into a recess in the low-precision piece and secured, for example, by being epoxied into place to hold the pieces together. FIG. 10A shows an example high precision piece 1000 made of silicon using one variant of the technique. As shown in FIG. 10A, the corners of each high precision silicon piece are chamfered 1002, specifically at 45 degrees, to allow a region of space, between the high precision silicon piece 1000 and the innermost edge of the receiving portion of the low precision piece, for a fastening agent. As noted above, other features or holes can be used along with or instead of the chamfers for a similar purpose. Alternatively, as shown in FIG. 11 the high-precision piece 1102 can be set up to mount flush on a face 1104 of the low-precision piece 1106.

It is also important to place the high precision piece accurately on or into the low-precision piece so that the fibers in the connector will align properly with their counterparts. This can be done, for example, by inserting an alignment piece 106 (such as shown in FIG. 1) containing alignment pins 110 which will protrude through holes 1108 in the low-precision piece and then through the alignment holes 1110 in the high precision silicon piece 1102.

Depending upon the particular connector, the alignment pins can be removed at this point and not used in any further operation, if they are not needed or not desired for the particular use (thereby creating a female version) or they can remain in (to thereby create a male version), for example, as would be the case for the MTP connector of FIG. 1.

As noted above, both the high precision piece and the low-precision piece have alignment pin holes which allow the accurate insertion of the high precision piece into the low-precision piece. The high-precision piece is inserted by placing alignment pins through the holes in both the high-precision piece and the low-precision piece and then sliding the two pieces together. Because the alignment pins as well as the placement and size of the holes in both pieces is very accurate, the two pieces are aligned to a very tight tolerance.

In the male version of the connector the alignment pins are permanently inserted into the connector. In the female version of the connector, the pins are removed. When a male and female connector are joined, if the connector contains a female side high precision piece, the alignment pins in the male side of the connector slot through the high-precision piece holes into the holes in the female side low-precision piece. The high precision piece is thin and strong but brittle, so that, for the female piece, repeated alignment pin insertion results in increased stress during connector combining that can ultimately cause the high precision piece to crack.

Since the holes in the low-precision piece alone can supply the required accuracy in mating male and female pieces, and provide the necessary strength in connection, the alignment pin holes in the high-precision piece are not essential for proper operation. Their primary function is for accurately placing the high-precision piece into the low-precision piece. Once the high precision piece has been affixed to the low-precision piece, the need for the alignment pin holes in the high precision piece is eliminated. Thus, to avoid creating a cracking problem, the general procedure described above is slightly different for creating a female side connector than for creating a male side connector. In overview, the procedure is as follows:

A low-precision piece in which the spacing accuracy of the alignment pin holes, and the depth into which the alignment pins will insert into those holes, is sufficient to align and hold a connector together even if no high precision piece were presents is created.

A high precision pieces with accurate alignment pin holes is also created.

The alignment pin holes in each are used to properly place the high-precision piece relative to the low-precision piece.

Thus, in greater detail, for both male and female pieces, the assembly process is initially the same. The high precision piece, containing holes for fiber placement and holes for alignment pins, and the low-precision piece, containing a location to situate the high precision piece and alignment pin holes, are brought together.

Alignment pins are then inserted through the low-precision piece so that they extend a sufficient distance beyond where the high precision piece will be attached.

The high precision piece is then inserted onto the alignment pins and seated against the low-precision piece. At this point, the high precision piece is positioned extremely accurately with respect to the low-precision piece.

The high precision piece is then fixed in place, for example, using an epoxy, to create the complete ferrule.

For a male side connector, the alignment pins are left in-place. For a female side connector, the alignment pins are removed.

Figure 34A:
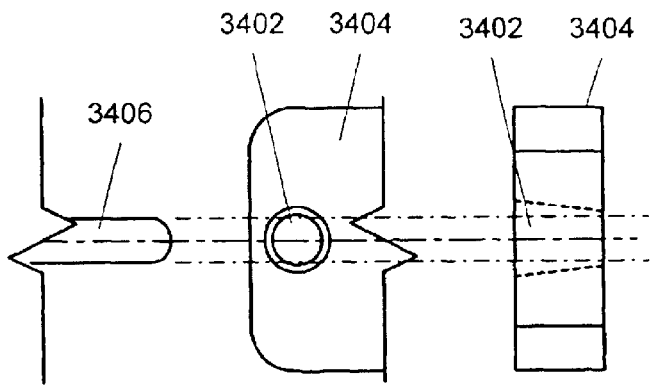
FIGS. 34A–34C are example variants for avoiding stressing a high precision piece in a female connector.
Figure 34B:
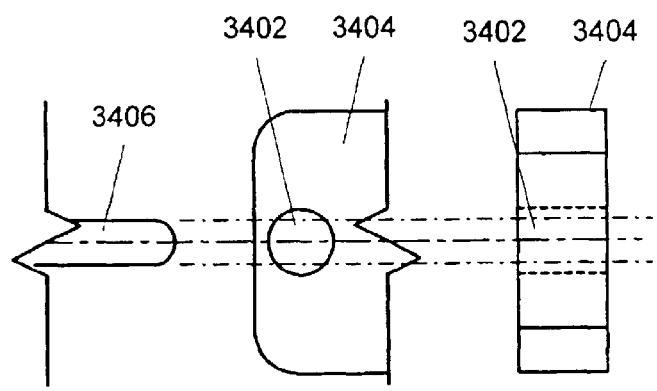
Figure 34C:
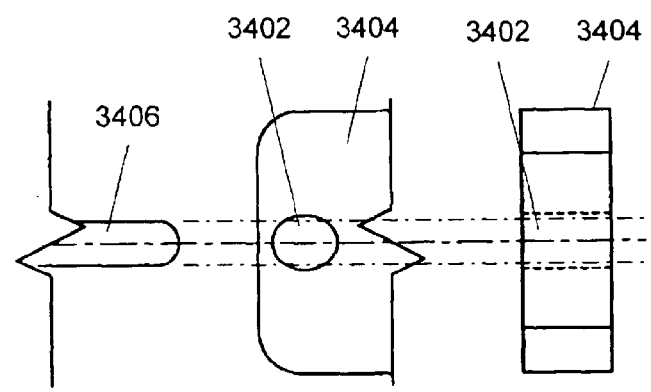
Figure 35:
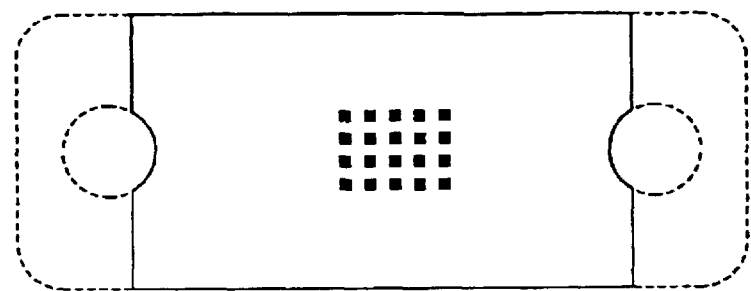
FIG. 35 is an alternative example of a variant for avoiding stressing a high precision piece in a female connector.
Figure 36:
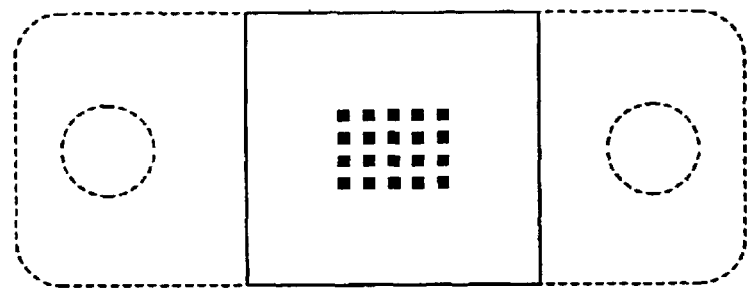
FIG. 36 is an additional alternative example of a variant for avoiding stressing a high precision piece in a female connector.

Female side pieces are then further processed by modifying the alignment pin holes of the ferrule so the high precision piece is not overstressed by repeated attaching and detaching of a connector. Thus, for a female piece only, the alignment pin holes, in only the high precision piece, are either:

a) ground or etched larger, either for their entire diameter, in a funnel (i.e. tapered or cone) shape, oblong shape, or other shape that sufficiently enlarges the alignment pin hole 3402 in the high precision piece 3404 (shown in front view and with exaggerated thickness in side view in FIGS. 34A–C) relative to the size of an alignment pin 3406);

b) partially removed (FIG. 35); or c) fully removed (FIG. 36), so that the alignment pins from a male connector can easily pass through or by the high precision piece without stressing it. The alignment pin holes on the low-precision piece are, however, kept to an original tight tolerance so that the two pieces can be accurately connected in a repeatable manner. In practice, using a funnel shape for the holes, for example by polishing, ensures that the entrance to the high precision piece is wider than the alignment pin to avoid excessively stressing the piece and also allows the hole to direct the alignment pin towards proper placement.

Figure 37:
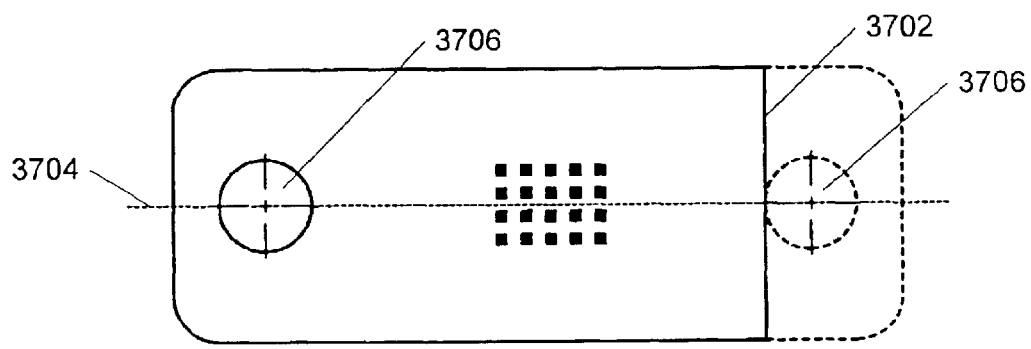
FIG. 37 is a further alternative example of a variant for avoiding stressing a high precision piece in a female connector.

In alternative variants, hole modification may be partly performed before the high and low-precision pieces are joined. This can occur in a few different ways. If a funnel shape is used, the hole size near one surface or the other surface of the high precision piece must be unchanged. If the holes will be partially or completely removed prior to joining (FIG. 35), as in FIG. 35 or 36, one or both sides can be partly removed, so long as enough of the two alignment holes remains (to accept the guide pins in the proper spacing) before joining. If the holes will ultimately be completely removed, one end of the piece can be removed, provided the edge surface 3702 at a perpendicular to the plane 3704 through the centers 3706 of the alignment pin holes maintains the proper spacing (FIG. 37).

If a funnel type or partial-hole removal modification is done, an optional strengthening coating can be applied to the surface of the cone shape or wall of the part of the hole that remains to harden the surface and prevent or reduce scratching. Depending upon the particular case, this coating can be a metal, such as gold, or a harder substance such as silicon nitride, silicon carbide, diamond thin films, etc. which can be deposited as required on a piece, multiple piece, or wafer at a time, basis.

Fibers are inserted through the low-precision piece and then through the high precision piece so as to terminate in, or just beyond the outer face of the high precision piece. The low-precision piece then is filled with epoxy to hold the fibers in place via, for example, an inlet formed in the piece. If desired, the combined unit can then be polished so that the ends of the fibers are flush with the face (i.e. the front) of the combined piece or slightly protruding. Optionally, the face of the piece where the fibers are visible can be coated with a diamond thin film (or other hard material) to prevent the silicon from being worn down during the polishing process.

Feature Optimization

In order to have accurate fiber placement, the wafers that are used are typically relatively thick, for example, at least the thickness of an optical fiber or about 100 microns. However, holes that will receive optical fibers must be accurate, in diameter or in their narrowest dimension in the case of non-round or oval holes, to approximately 1 micron. In some variants however, this tolerance is extremely tight and can be difficult to consistently achieve from wafer run to wafer run and/or to maintain with consistency across entire wafers, which presently range from 4 to 12 inches in diameter, for silicon wafers.

Advantageously, we can form an array of features, such as grooves, holes, bumps or posts in a wafer of material in such a way that, after the forming is performed, the wafer can be post-processed to optimize the size of the features to extremely high accuracy, for example, less than ±1 micron. In fact, this technique is applicable to any analogous circumstance where great accuracy in sizing is required.

Referring to FIG. 38, the process will now be described with reference to partial top and side views of a portion of a single high precision piece 3800 that has multiple through holes 3802, 3804 that will each carry a single optical fiber. While FIG. 38 shows the process with reference to a portion of a single high precision piece 3800, it should be understood that the process will typically be performed on a wafer containing hundreds or thousands of pieces. For simplicity, only two holes 3802, 3804 on the single piece 3800 are shown. In addition, it should be understood that the piece may also have other non-fiber bearing features, such as waveguide features, indentations, bumps, etc. and, should there be a need to post-process any of them for high accuracy, the process will be the same for them.

In practice, for an optical fiber specified at 125 microns in diameter, it is desirable that the hole in the piece that will hold the fiber typically be between about 125.5 microns and, preferably, about 127.5 microns in diameter on the end that will be closest to the device (e.g. lasers and detectors) that will be coupled to the fibers (referred to as the "activity end"). However, due to imprecision in processing tolerances, fiber hole diameters can vary from wafer to wafer or across a wafer such that, despite process controls, they can be as much as 130 microns in diameter. Since this small (2.5 micron) difference can be considered substantial, relative to the placement accuracy typically required, the difference can be corrected in the following manner.

First, the activity end of the fiber holes are measured to determine their deviation "D" from the desired diameter.

Next, a metal, for example gold, is deposited on the wafer 3800 including the walls of the holes 3802, 3804, for example by sputter deposition, to provide a thin conductivity layer 3806 over the exposed material. Depending upon the particular variant, this can be done on either one or both sides of the wafer. If metal is sputtered only on one side, then the holes will typically have covering only about half way into the depth of the holes. This creates, in effect, a partially tapered hole. Moreover, sputtering the metal on one side is typically sufficient, since the accuracy of hole diameter is most important on the activity end when the feature is a hole for fiber placement. Alternatively, if the wafer is made of a conductive material or at least a highly doped semiconductor material, then depositing of the metal may be omitted, unless electroless plating is used.

Depending upon the particular case, the wafer is then either electroplated or is put through an electroless plating process in order to build up a material layer 3808 on the conductive surfaces. Depending upon the particular case, the plating material can be gold, silver, zinc, or other materials can be used. The electroplate/electroless plating process builds up the material on the conductive surfaces in an even fashion (i.e. the thickness grows on the hole walls at about the same rate as it grows on the flat surface of the wafer). Moreover, the growth rate can be precisely controlled so that the holes are filled, from the sides inward, until the diameter of the hole "d" at the exit is the desired thickness.

Thereafter, the processing occurs according to one of the variants described herein.

In some variants, wafers are polished prior to plating so that no material is plated on the surface, but it is the holes. In yet other variants, wafers are polished after plating to remove the plating material from the surface. In other variants, the post-plated wafer can be partially polished, so that some plating material remains so that remaining metal can be used in a metal-to-metal fusion process to join the wafer to another (or one or more of its pieces to others). In still other variants, some of the deposited metal is selectively removed from particular features or surfaces by further processes to further control the location(s) where the plating will occur.

Alternatively, hole size can be controlled in an analogous fashion, for some materials, through treatment of the wafer with a reactive gas. For example, as described in greater detail below, by exposing a silicon wafer to steam under the right conditions, for example as determined using the Deal-Grove equation, the silicon will oxidize into silicon dioxide. While this oxidation process changes the index of refraction of the silicon, because silicon oxides are not as dense as the silicon wafer itself, the reaction also causes the surface to grow. As a result, oxidation of a hole will cause the wall of the hole to grow inward and reduce its overall diameter. Since these treatment processes can also be highly controlled, in some variants they can be used instead of the plating process. In some variants, both processes can also be used, for different features in the same area of the wafer or for different areas.

Applications

The processes described above for creating the different pieces have numerous applications. A few will now be described in simplified fashion, bearing in mind that more complex arrangements and/or combinations of the described applications can be readily created using variations on the techniques and applications described herein.

Ease of Insertion Variants

Pieces, which have a wide opening on the side where fibers will be inserted while having a narrower opening at the point where the fibers exit, can be used to make fiber insertion easier.

Figure 12:
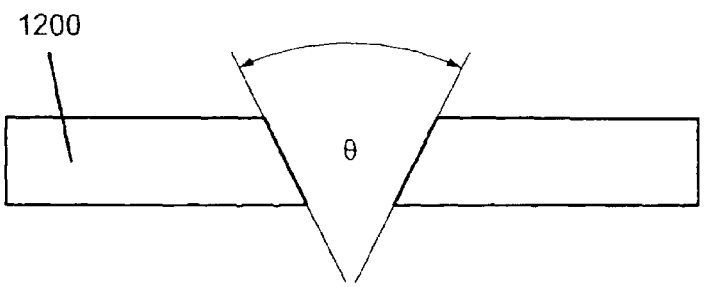
FIG. 12 shows a tapered piece having a potentially large angle of insertion.

As shown in FIG. 12, a tapered piece 1200 by itself would result in a potentially large angle of insertion "θ" because the fiber will not be constrained within the piece in a particular position owing to the fact that it can be inserted at an angle, rather than straight in. This is not desirable since it can cause a loss of light when coupling light between two such connectors or when connecting a fiber bundle to a component that emits, detects or routes light.

In order to ensure that the angle is minimized, any of four basic approaches (or some combination thereof) are used.

Figure 13:
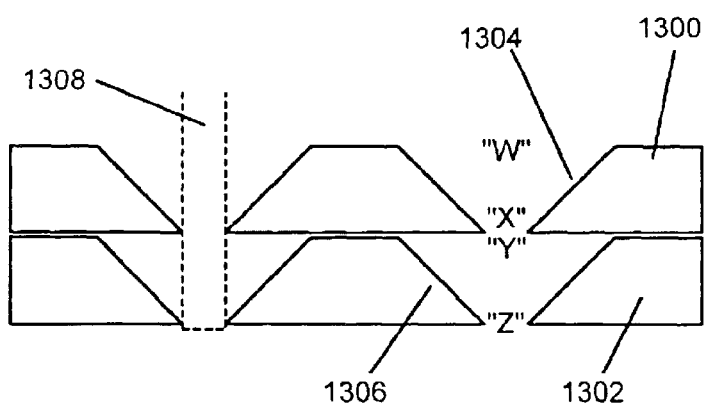
FIG. 13 shows one approach to ensuring that an angle of insertion is minimized.

Approach 1: Two high-precision pieces 1300, 1302, having tapered sidewalls 1304, 1306 are stacked on top of one another so a fiber 1308 has to pass through two narrowing regions (the tapered sidewall holes) which are separated by a space (of typically either the thickness of the last piece to be passed through or that thickness plus some other distance). This is illustratively shown in FIG. 13. Ideally, in such a case, the hole on the side of the piece into which a fiber will first be inserted will have a diameter W and the hole on the opposite side will have a diameter X, where W>X. Ideally, the diameter X will be close to the diameter of the fiber, although it will likely be larger. The other piece will have a hole, on the fiber entry side, of a diameter Y which can be any size equal to, or between, W and X. The exit side of the other piece will have a hole diameter of Z, where Y≧Z.

Figure 15:
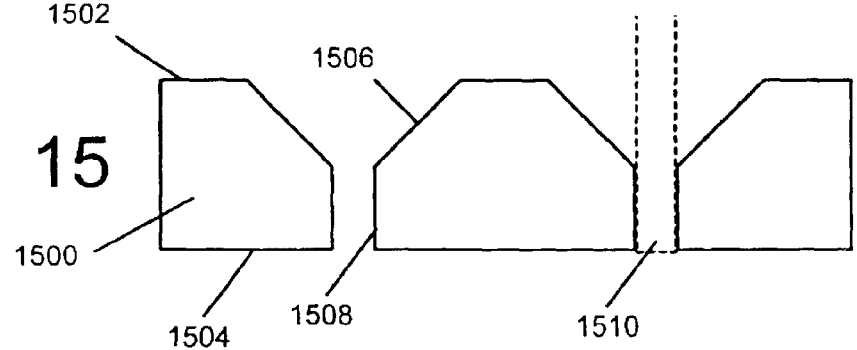
FIG. 15 shows a third approach to ensuring that an angle of insertion is minimized.

Approach 2: The two high-precision pieces 1400, 1402 are stacked on top of one another as above, but the first one to be entered by the fiber has tapered sidewalls 1404 and the other is etched or drilled with "straight" sidewalls 1406 (i.e. they may, or may not, be angled with respect to a perpendicular to the surface of the piece). The tapered region allows ease of insertion of a fiber 1408 while the straight region maintains a low angle of insertion for a fiber 1408. A longer region of straight sidewalls provides more support and stability for the fiber and thus holds it in place more firmly and without the risk of edge pieces nicking the fiber. This is shown in FIG. 15.

Approach 3: A single high-precision piece 1500 is fabricated in a two-step process where the piece is etched in a tapered fashion on one side 1502 and then etched anisotropically on the other side 1504 so that the hole on one side of the piece is tapered 1506 while the other side of the hole in the piece has straight sidewalls 1508. This results in a single piece (which saves material costs and assembly time) that allows for easy fiber insertion and a low angle of insertion of a predetermined offset from a perpendicular to the piece for single mode fibers. This is shown in FIG. 5.

The piece in this approach could be twice as thick as in approaches 1 or 2, so as to fit into the same low precision piece. Alternatively, a low precision piece specifically designed to accept the piece made using approach 3 can be used.

Approach 4: Either two piece approach above is used, but the fiber holes in one or both of the two pieces are made slightly oval, although not necessarily in alignment with each other. This allows for more flexible spacing of the guide pin holes to account for inaccuracies in either the guide pins themselves or the guide pin holes, which are sometimes less accurate than the fiber holes due to their size.

Figure 16:
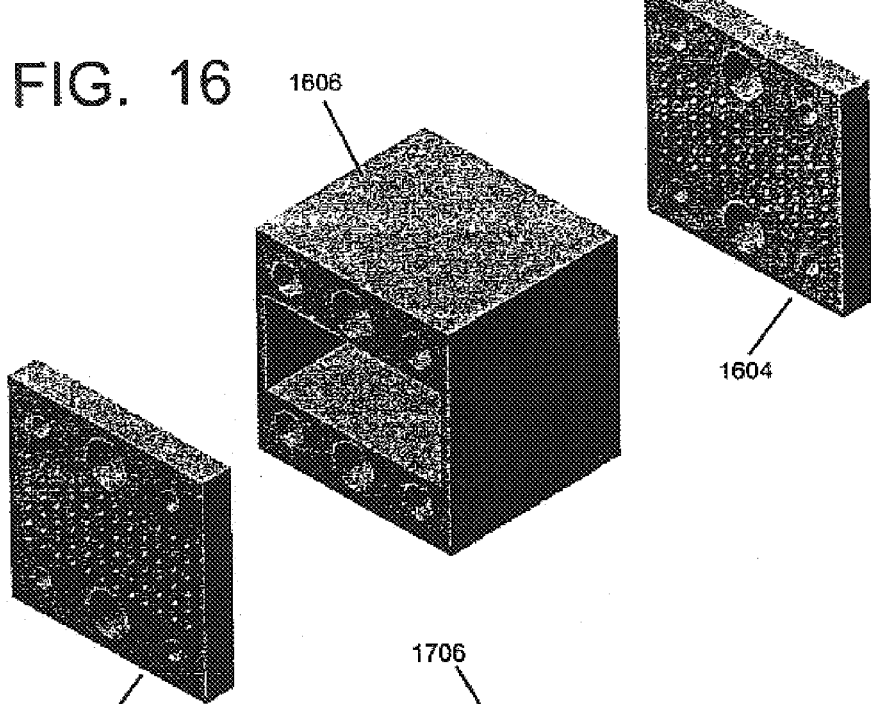
FIG. 16 shows a variant comprising two high precision pieces and a chamber.
Figure 17:
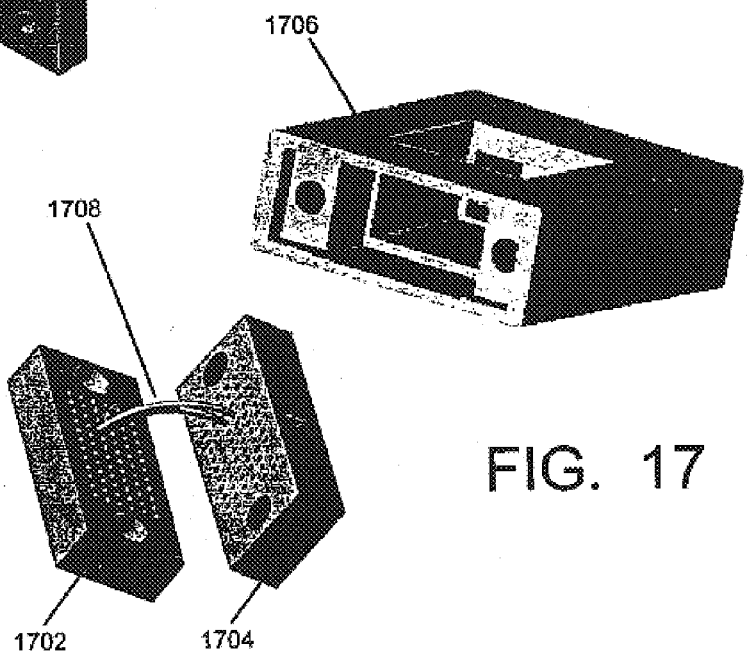
FIG. 17 shows another variant comprising two high precision pieces and a chamber.

In still other variants, such as shown in FIGS. 16 and 17, two high precision pieces 1602, 1604, 1702, 1704 are created as described herein. In addition, a low precision "chamber" 1606, 1706 is also created between the two pieces which can fully surround the fibers (such as shown in FIG. 16), partly surround the fibers (such as shown in FIG. 17), or not surround the fibers at all (for example by using precision standoffs or spacing posts). In other words, instead of being stacked against each other, the high precision pieces 1602, 1604, 1702, 1704 will each be separated from each other by the chamber 1606, 1706 or the standoffs/posts. Individual fibers or a fused tapered one or two dimensional arrayed waveguide structure, either in Y-Branch 1708 or straight form, is inserted through each of the high precision pieces 1602, 1604, 1702, 1704 to create a collimating element, "shuffle" signals passing through the element from one side to the other, or perform a 2 (or more) to 1 mapping of optical devices to optical fibers. Once the fibers are inserted, the high precision pieces 1602, 1604, 1702, 1704 are attached to the chamber 1606, 1706 and the chamber or area around the fibers is filled with an epoxy or other hardening agent. The portions of the fibers extending outside the element are then cut off, and the exposed faces are polished as noted above. This will allow, for example, a one or two dimensional array of lasers to be coupled in groups into a separate array of fibers, multiple devices which emit at different wavelengths to be coupled into individual fibers, or multiple lasers at a single wavelength to be coupled into single fibers to allow redundancy during data transmission.

High Accuracy Holding Variants

Two pieces that are designed with commonly aligned fiber holes but alignment holes or other structures that are offset, relative to each other, can be used to provide greater accuracy in fiber holding than either piece can provide alone.

Instead of having the aligning structures in the two pieces in exactly the same position with respect to the fiber holes, the relationship between the aligning structures and the fiber holes is offset so that the fiber holes in the two pieces do not completely line up. FIG. 18 shows one hole 1800 for a high-precision piece superimposed over an optical fiber 1802. Note that the hole is almost 25% larger than the diameter of the fiber. FIG. 19 shows two fiber holes 1900, 1902 of the same size as in FIG. 18 on different high precision pieces according to this variant. Instead of the fiber holes being aligned when the pieces are aligned, these fiber holes are offset relative to each other when the alignment structures or holes are aligned. The offset is intentionally set at about a predetermined amount, such that the two closest parts of the holes are spaced apart by about a fiber diameter. The offset Δ (as shown in FIG. 19), allows two holes which are larger than a fiber to hold that fiber very accurately since the width of the biconvex opening 1904 formed by the two pieces, taken along a line passing through the centers of the holes, is very close to the diameter of the fiber to be placed inside and be closely constrained. Ideally, as shown in FIG. 20, the holes 2000, 2002 are the same size (so the offset is equally divided between both pieces) so that a single wafer can be used to create one format piece and two identical pieces can be used to hold a fiber 2004 by placing them back-to-back. By way of example, if for a particular application the fiber holes were, 4 microns too large, offsetting the two pieces by a few microns increases the pitch accuracy from a worst-case of 4 microns to as much as a sub-micron accuracy. This potentially provides a substantial improvement in coupling efficiencies between fibers.

Figure 21:
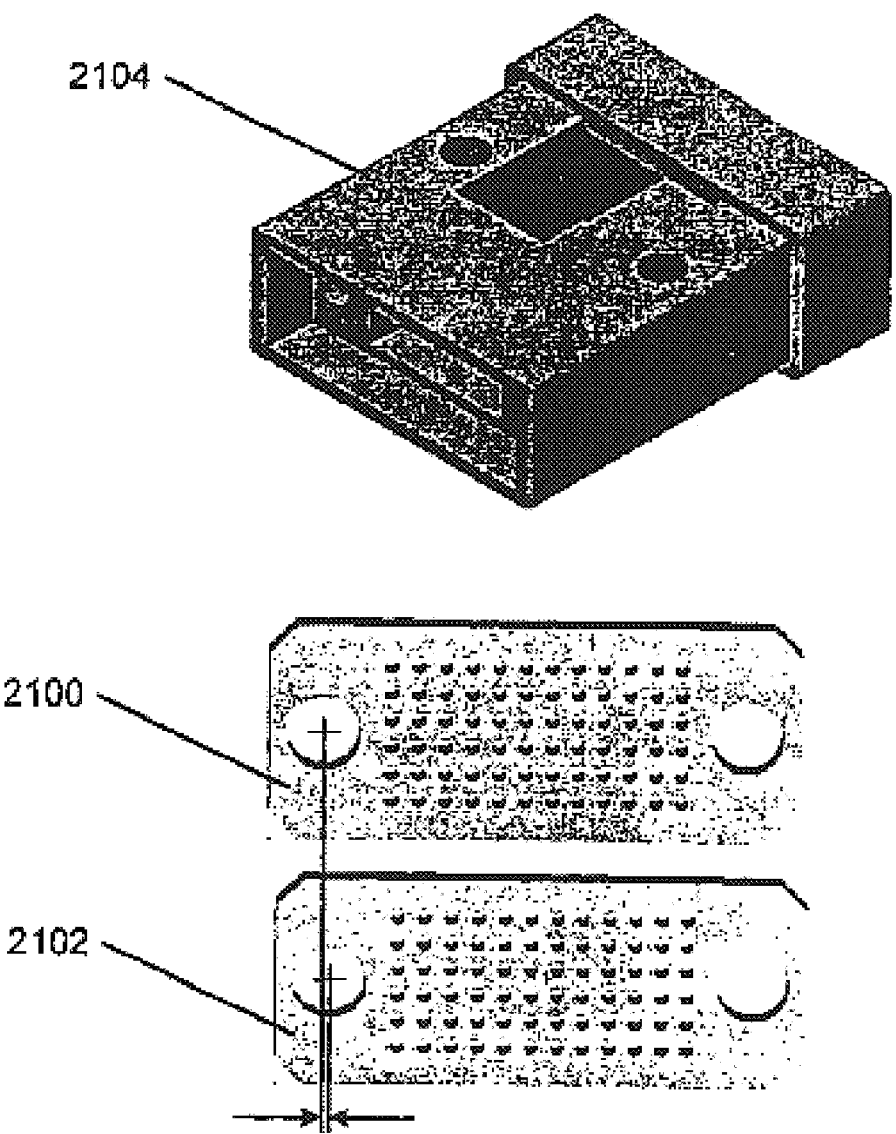
FIG. 21 shows one example of a three piece holder approach.

As noted above, elements can be created that combine a high precision piece and a low precision piece. Advantageously, if it is possible in the particular case to make a "low precision" piece with a hole size of a specified (im)precision but precise offset, then only one high-precision silicon piece need be used to hold a fiber with high accuracy. This further reduces the number of element components from three to two. FIG. 11 shows one example of the two piece holder approach and FIG. 21 shows one example of the three piece holder approach using the high precision pieces 2100, 2102 having the specified offset Δ and a low precision piece 2104.

The combined pieces can be made in a size and shape that is compatible with conventional connectors, for example, the low-precision piece is the size and outer shape of the conventional ferrule for the connector of FIG. 1.

Thus, the precision of the fiber hole pitch of the combined unit is higher than the precision that would be obtained by using or conveniently or cheaply obtainable with any of the individual pieces themselves.

Waveguide, Coupler and Collimator Variants

The high precision pieces need not necessarily be designed to hold a fiber. Instead, an arbitrary number of pieces can be created such that, an individual piece, or a number of pieces once the pieces are stacked create a waveguide, coupler or collimating element through etching and filling the etches with an optically transmissive medium.

Such elements are constructed by patterning structures such as holes or paths on individual high precision pieces in an aligned or offset layered fashion and then stacking those pieces together to form optical routing topologies in two or three dimensions. This makes creation of not only simple waveguide structures possible, but more complicated waveguide topologies, structures to route optical signals through the use of photonic bandgap engineering materials containing periodic structure features throughout the material in each of the pieces, or integration of other elements, for example, (by etching or depositing lenses or diffraction gratings in one or more of the pieces. Through creative use of the technique, even more complex geometric arrangements or combinations can be achieved.

In overview, the waveguides, couplers or collimators are made using the following general process:

Guide structures are formed in the material that forms the frame of waveguide, coupler or collimator. The material is then treated with a reactive gas to create a low refractive index cladding layer on the surface of the structures. The remaining volume of the post-treatment structure is then filled with a sufficiently high refractive index material, relative to the cladding layer.

Specifically, in the case of the silicon wafers described herein, the approach is a s follows.

First, the appropriate guiding structures (cavities) are pattern etched in the wafer, typically a silicon wafer. Then the wafer is treated with a reactive gas, in the case of silicon, to for example, oxidize the exposed surface, which creates a relatively low refractive index cladding layer on the surface of the cavities. Alternatively, different reactive gasses can be used that will turn the silicon into an oxy-nitride or a nitride. Then the remaining cavity is filled with a high refractive index material, for example, epoxy. Further optional processing can then be performed such as etching any excess epoxy, polishing, cleaving and/or stacking as necessary.

With our approach to making waveguide, coupler or collimator structures several beneficial aspects are achieved. We achieve precision spacing in two dimensions for a 2-dimensional array or in two- or three-dimensions for a 3-dimensional array, our structures are batch manufacturable so they are east to fabricate, they can be integrated into commercially available ferrules and/or connectors, and they have a high confinement factor (i.e. there is little loss due to the structure itself even if the structure has bends, turns, tapers or y-branches in it.), to name a few.

In some variants, the walls of the holes or guides are also coated with a metal layer before the epoxy is flowed into the holes or guides. In other variants, instead of, or in addition to, the metal layer, a thin, low dielectric material layer is added on top of the metal, prior to flowing the epoxy. In still other variants, the walls of the holes or guides are treated with a reactive gas to, in the case of a silicon wafer, oxidize the silicon into silicon dioxide.

Although, as noted above, silicon wafers can be used to form the guiding structures, silicon, by itself, generally causes unacceptable losses at shorter optical wavelengths, for example, wavelengths below 1 micron, because it has a very high refractive index (refractive index$\geq$3) and light tends to migrate to high refractive index materials. This makes silicon less suitable, by itself, for use in creating efficient guide structures. Thus, for light to be efficiently guided through the holes or along the waveguides, an optically transparent material, having a higher refractive index than the silicon by itself, must be used to fill the holes and such materials are not readily available at present. Alternatively, the portion of the silicon that is to guide the light must be coated with a material having a much lower refractive index.

Advantageously, in alternative variants, we accomplish this by coating the walls of the guiding structure with a low loss relatively low refractive index material and then filling the center of each guiding structure with a low loss, material having a sufficiently higher refractive index relative to the coating to direct light along the guiding structure. Since both the coating material and filling material cause low losses and have sufficiently different refractive index values, an efficient guiding structure (i.e. coupler, collimator or waveguide) is created.

Note that, as detailed above, the epoxy or other material which is flowed into the holes needs to be a higher refractive index than the material which is used to form the walls of the holes. If this is not the case, then the walls of the holes in the wafer pieces that will serve as part of the waveguides are metalized using, for example, electroplating or electroless plating. By "metalizing" the structure we mean that a metal is used to coat the surface of the holes.

Metals however, can also cause unacceptable losses. For example, gold, which has about a 95% reflectivity, can be used. However, during traversal of gold coated holes in a structure, light can bounce off of the gold 10 times or more. If this occurs, only about 60% of the entering light will exit the structure. Losses of this magnitude are typically unacceptable in most applications. It is much more desirable to have structures with a greater optical throughput, preferably about 98% or better.

Because the coating needs to be of low refractive index, very thin, and very uniform throughout the guiding structure to be most efficient, a technique such as sputtering a dielectric with these attributes onto the walls of the structure can also or alternatively be performed. However, doing so requires extremely good process tolerance in addition to adding further steps to the fabrication process.

In cases where sputtering of a dielectric is undesirable, for example, due to the inability to maintain the necessary process tolerances or the increased costs associated with adding those additional steps, a further alternative method may be used.

In this alternative method, the structure is treated with a reactive gas so, in the case of silicon, it is oxidized (the conceptual equivalent of causing iron to rust) to form a thin coating of silicon dioxide on the surfaces of the structure or converted to silicon oxy-nitride or silicon nitride using an analogous process. Since, in this variant, the coating or cladding is not deposited or made by etching—it is a thermally grown material—it actually smooths out any existing sidewall roughness as it is formed. As a result, it creates a highly uniform, extremely controllable refractive index material that can be deposited in a single operation to extremely tight tolerance, even over 12 inch silicon wafers.

This coating also causes extremely low loss at optical wavelengths in the 300 nm to 2000 nm range. Moreover, the refractive index of the oxide of the silicon is approximately 1.46, which is relatively low relative to that of the silicon itself. Thus, this coating makes it possible to make a very efficient waveguiding structure by filling the remaining cavity with a high-refractive-index material, for example, an epoxy such as polyimide which has a refractive index of up to about 1.8. The refractive index ("RI") difference between the formed oxide (RI$\approx$1.46) and the polyimide (RI$\approx$1.8) is sufficient to efficiently pass light, even through a long structure and/or from laser sources which are highly multi-mode, or instances where the light is extremely divergent because it exits the laser source at a large angle.

Figure 39:
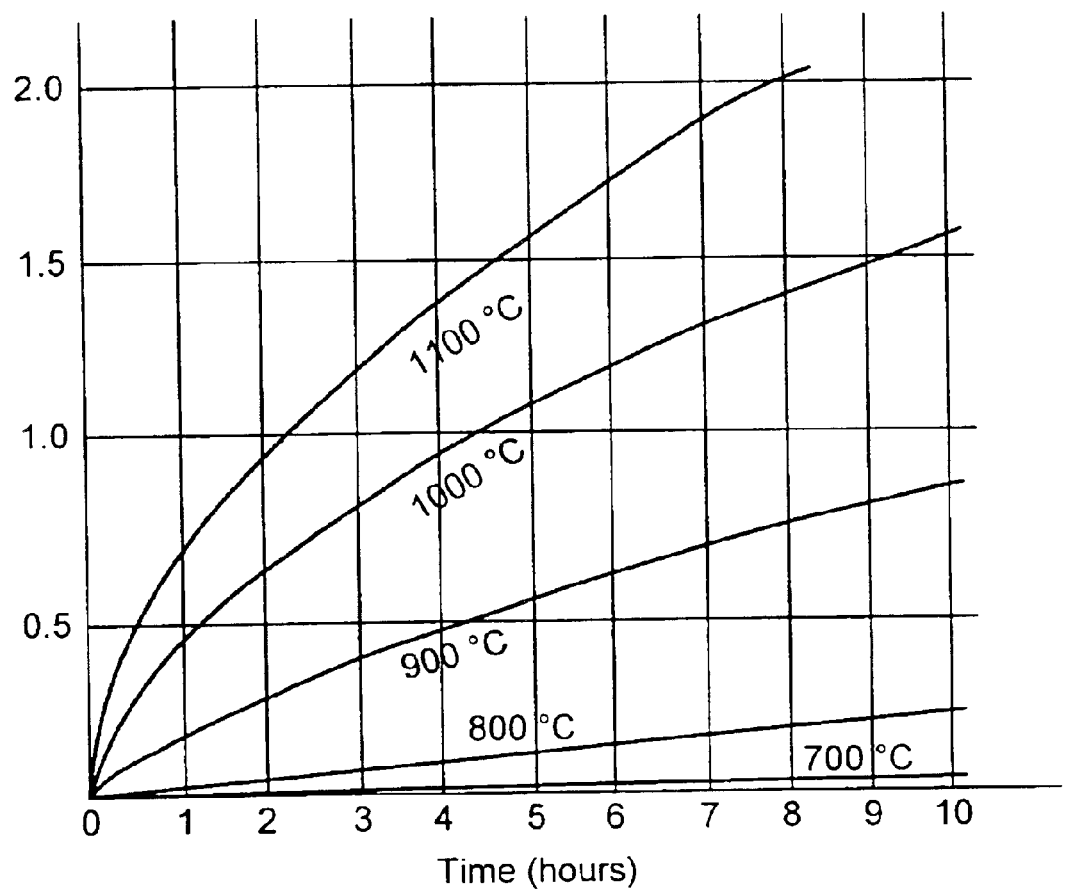
FIG. 39 is a set of thickness vs. time curves for the oxidation of silicon based upon the Deal-Grove equation.

Oxidation of the silicon wafer is performed in a steam environment. As can be seen from the Deal-Grove equation based graph of FIG. 39, at a temperature of 1100 degrees Celsius, for example, the silicon wafer will be oxidized to form a cladding layer of silicon dioxide two microns thick in about 8 hours. Advantageously, an entire wafer full of guiding structures can be reacted simultaneously. Thus, even though in the example, the process takes about 8 hours, hundreds or thousands of parts can be done at one time, so the per-piece throughput is very high.

We have determined that, using this process, on silicon wafers, produces an oxidation layer of silicon dioxide that is extremely uniform. In fact, we have made structures in silicon containing several millimeter long holes, 50 microns in diameter, and, using the above referenced oxidation process, obtained a silicon dioxide coating on the walls of the holes that is uniform to any of our measurable tolerances.

We have further determined that, for a silicon wafer, oxidizing the silicon until the guide structures have a coating of between about 1 and about 10 microns is effective, with about 1.5 to about 2 microns of silicon dioxide creating a sufficiently thick cladding layer for commercial practice.

If a material, other than silicon, that has a high refractive index is used, an analogous approach can be employed to similar effect. Guide structures are formed in the material. The material is then treated with a reactive gas to create a low refractive index cladding layer on the surface of the structures. The remaining volume of the post-treatment structure is then filled with a sufficiently high refractive index material, relative to the cladding layer, to create the efficient guide structure.

Our approach uses one of two generic formats. The first format is a through-hole format, the seconds is a waveguide format. However, because a wafer scale, batch manufacturing process is used, either or both approaches can be used on a single wafer or even a single slab or piece.

Figure 41:
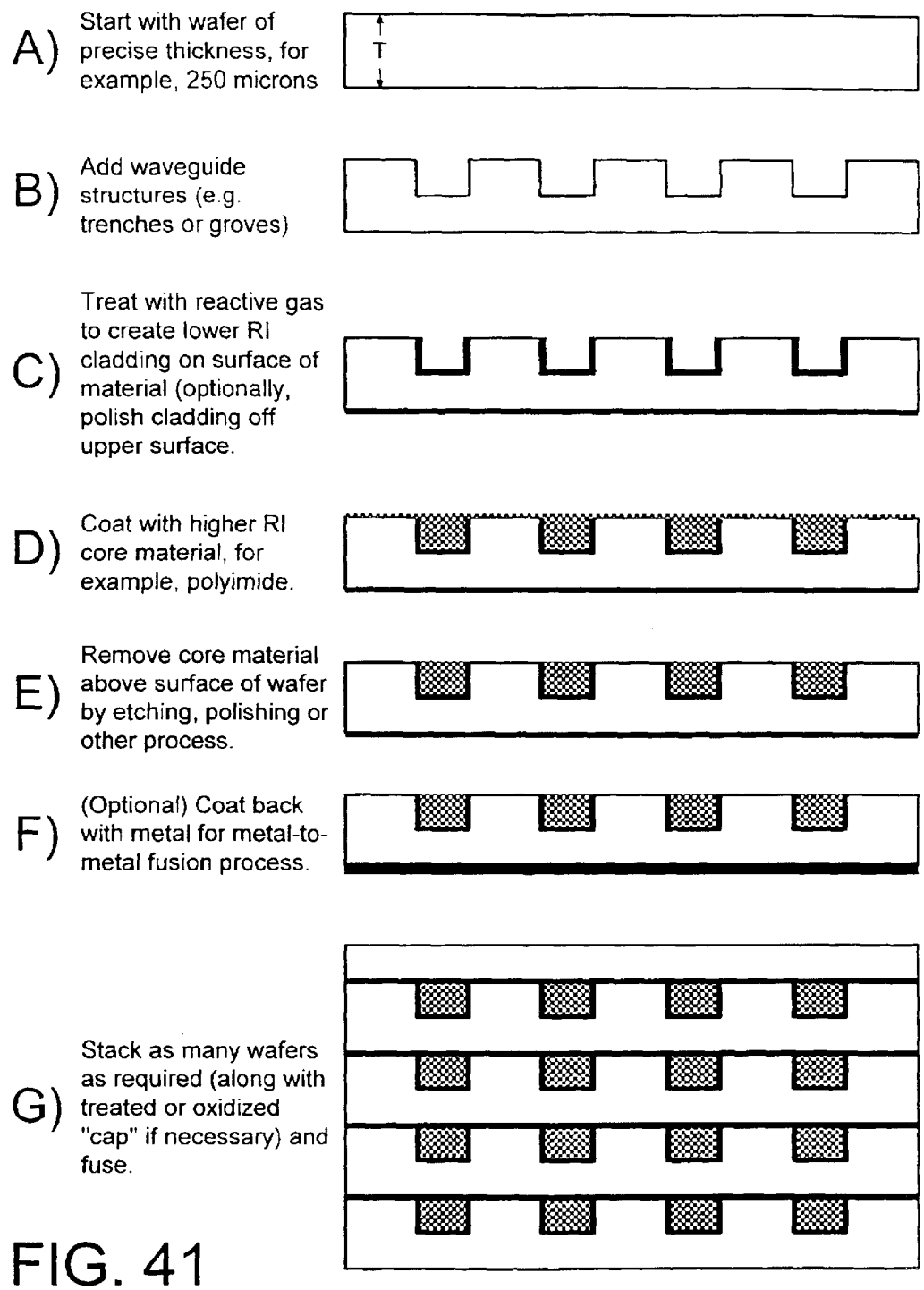
FIG. 41 is an example of a waveguide format light guiding structures.

Having described this reaction treatment or "oxidation"-type process, the two formats that we have devised will now be discussed with reference to FIGS. 40 and 41.

The first of the two, the through-hole format of FIG. 40D, involves taking a wafer (FIG. 40A), for example, a silicon wafer, and making holes in it (FIG. 40B), for example, straight, angled tapered, oval, etc. holes made by etching, drilling, micromilling, etc. the wafer so that the holes go through the piece, for example, in a one- or two dimensional array.

As noted herein, very precise spacing of holes can be made by etching since the patterning can be done via high-precision lithography techniques and because high-precision, fine feature etching of silicon is a well developed and understood technique. As a result, the silicon etching is described herein, for purposes of illustration, because etching silicon is easier than etching other alternative materials, such as glasses, for example, borosilicate glasses, or dielectric crystals, for example, Lithium Niobate.

Once the holes have been made, in this case etched, the etched holes are turned into guiding structures by treating the wafer with a reactive gas to change the holes into a lower refractive index material to act as cladding (FIG. 40C), for example, for silicon by treating with steam at a high temperature in this case by oxidizing the silicon wafer to create the cladding layer of silicon dioxide ($SiO_2$), followed at some point by filling the holes with a material with a higher refractive index than the cladding, e.g. in the example case polyimide or an optical epoxy (FIG. 40D).

In the waveguide format, several layers of wafers will almost always be stacked to make, for example, a two dimensional array. However, unlike with the through-hole format, the guide structures run along the surface of the wafer, such as shown in FIG. 41. This requires extremely precise spacing of wafers in the vertical dimension (FIG. 41A), particularly where, at the input or output side of the guide device, a precise pitch must be maintained. Advantageously, since silicon wafers of precise standard thicknesses, for example 250 microns. are readily available and have extremely tight tolerances on both the overall thickness and thickness uniformity, this thickness can be used to accurately space the wafers in the vertical dimension while the precision lithography techniques maintain accuracy in the horizontal dimension. In other words, in contrast to prior art techniques that pattern waveguides on the silicon wafer, waveguide structures, like trenches or grooves, are made into the surface of the wafer, for example by etching or micromilling (FIG. 41B), so that wafers (or pieces thereof) can be stacked top to bottom with consistent wafer tolerance level accuracy.

To make the waveguide format, trench structures are made into the surface of the wafer (FIG. 41B) and then the wafer is treated with a reactive gas to create a lower refractive index cladding on the surface of the material and thereby form a cladding layer on that surface (FIG. 41C), in the case of silicon it is oxidized into silicon dioxide. Optionally, cladding on the upper surface can be polished off (FIG. 41C). A core material coat that has a higher refractive index than the cladding is added, for example, a high-index material, like polyimide, is then put into the formed structures (FIG. 41D) and then any excess high-index material that may extend above or be on the top of the wafer is removed, for example by etching, polishing or other process (FIG. 41E). Optionally, if a metal-to-metal fusion process is to be used, a very thin metal layer is deposited on at least the back of the wafer (FIG. 41F). An appropriate number of wafers 4150 and, if necessary, a suitably treated or oxidized "cap" layer 4152 are then stacked and bonded together (FIG. 41G) by (for example) a wafer fusion process.

Depending upon the particular application to connect multiple pieces of either format (or pieces having both formats) direct silicon-to-silicon wafer fusion can be performed.

Alternatively, a metal can be applied to coat mating surfaces of the wafers (FIG. 41F) to make a metal-to-metal wafer fusion possible. In the metal-to-metal case, a thin (preferably much less than a half-micron thickness) layer of metal is used, so that, in the case of the second format, the thickness in the vertical dimension is within acceptable tolerances.

Figure 42:
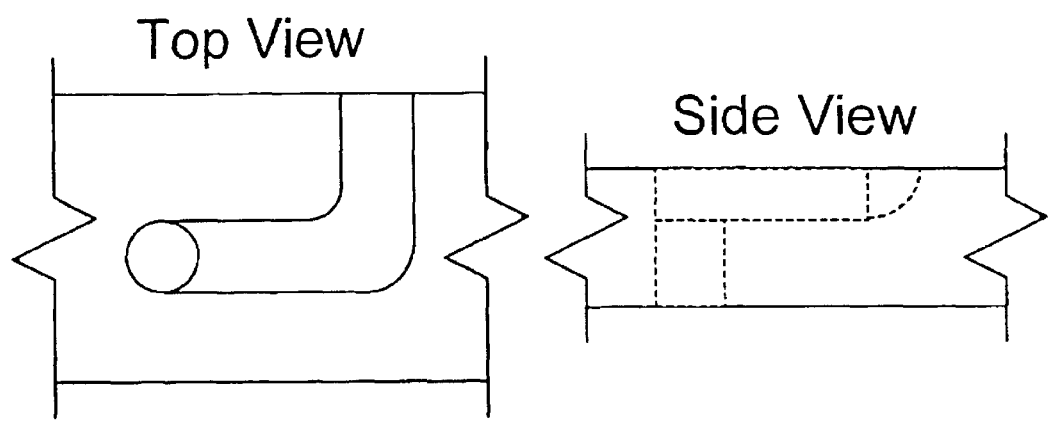
FIG. 42 is an example of a piece combining through-hole and waveguide formats.
Figure 43:
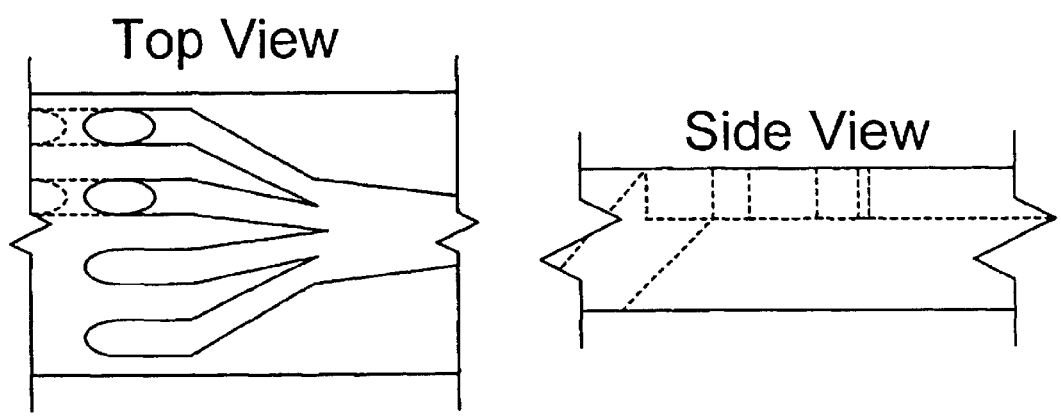
FIG. 43 is an example of a more complex geometry light guiding structure combining through-hole and waveguide formats.

In either format, the resultant waveguides, couplers or collimators (or their components) can be straight, curved, tapered, have more complex geometries, or more complex structures and the two formats can be used on a common wafer or piece as shown in FIG. 42 or FIG. 43.

In the case where multiple through-hole pieces are to be stacked and bonded, the epoxy can be inserted prior to bonding or post-bonding, depending upon the particular circumstances.

In the case where the waveguide format is used, the epoxy will most often be inserted prior to bonding.

In the case where a stack will contain both formats, the epoxy will typically be inserted prior to stacking however, particular configurations or geometries may necessitate a combination of pre- and post-stacking filling or filling only after stacking has occurred.

While the above description was in the context of one piece at a time, in both cases the process is a wafer-scale process. In the through-hole format, a wafer full of pieces is processed, oxidized and (where appropriate, epoxy filled) at one time. In the case of the waveguide format, the waveguide layer created in the wafer surface is done a wafer at a time.

In this manner, the resultant wafer can then be diced to produce the individual pieces that are used as is or stacked, or entire wafers can be stacked together and the sawn into individual partial or complete units. Thus, many thousands of devices can simultaneously be produced thereby keeping per-device costs down.

Figure 44:
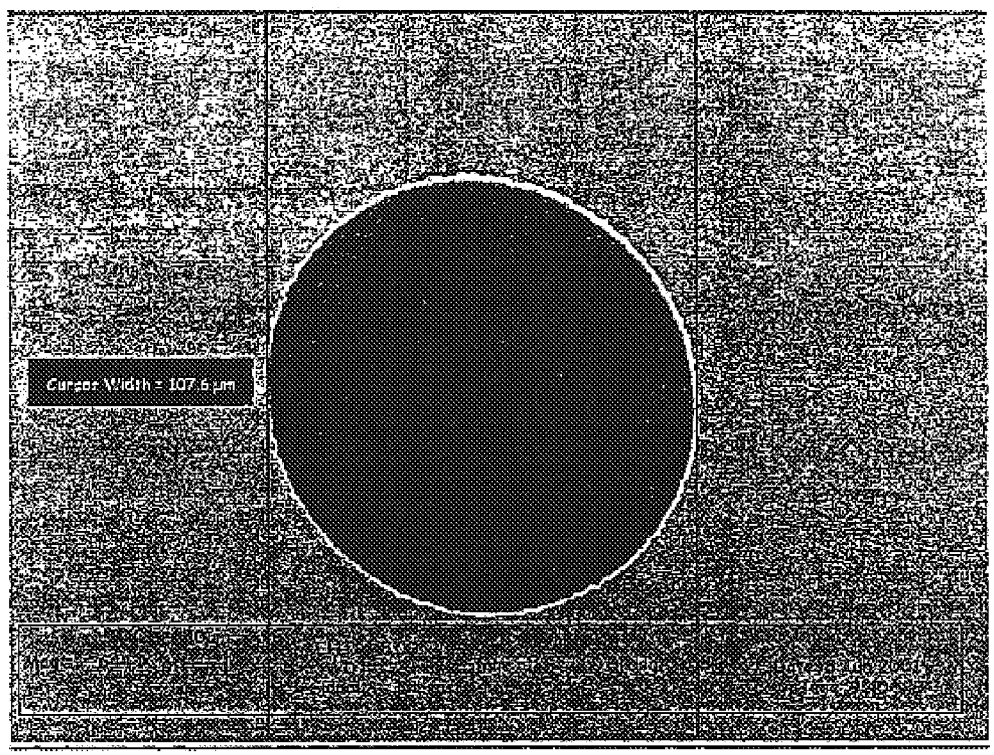
FIG. 44 is a photograph of a cross section of a guide structure made using the through-hole format.

Pieces have been made both in the through-hole and waveguide configurations. FIG. 44 is a photograph of a cross section taken of a guide structure made in silicon using the through-hole format. The hole is about 127 microns in diameter and an extremely uniform thin (~1 micron thick) ring of oxidation (silicon dioxide) can be seen on the surface of the hole.

In addition, through simulations of optical power through different structures according to the invention, including a taper and a bent guiding structure, we determined that the high refractive index difference between the silicon dioxide and the polyimide (1.46 to 1.8) allows input angles of up to 70 degrees with virtually no loss within the structures. This compares very favorably with, for example, traditional optical fiber that allows input angles of up to about 15 degrees.

Having described aspects of the process for making waveguides, couplers and/or collimators, some representative specific examples of uses of the above will now be described.

Figure 22:
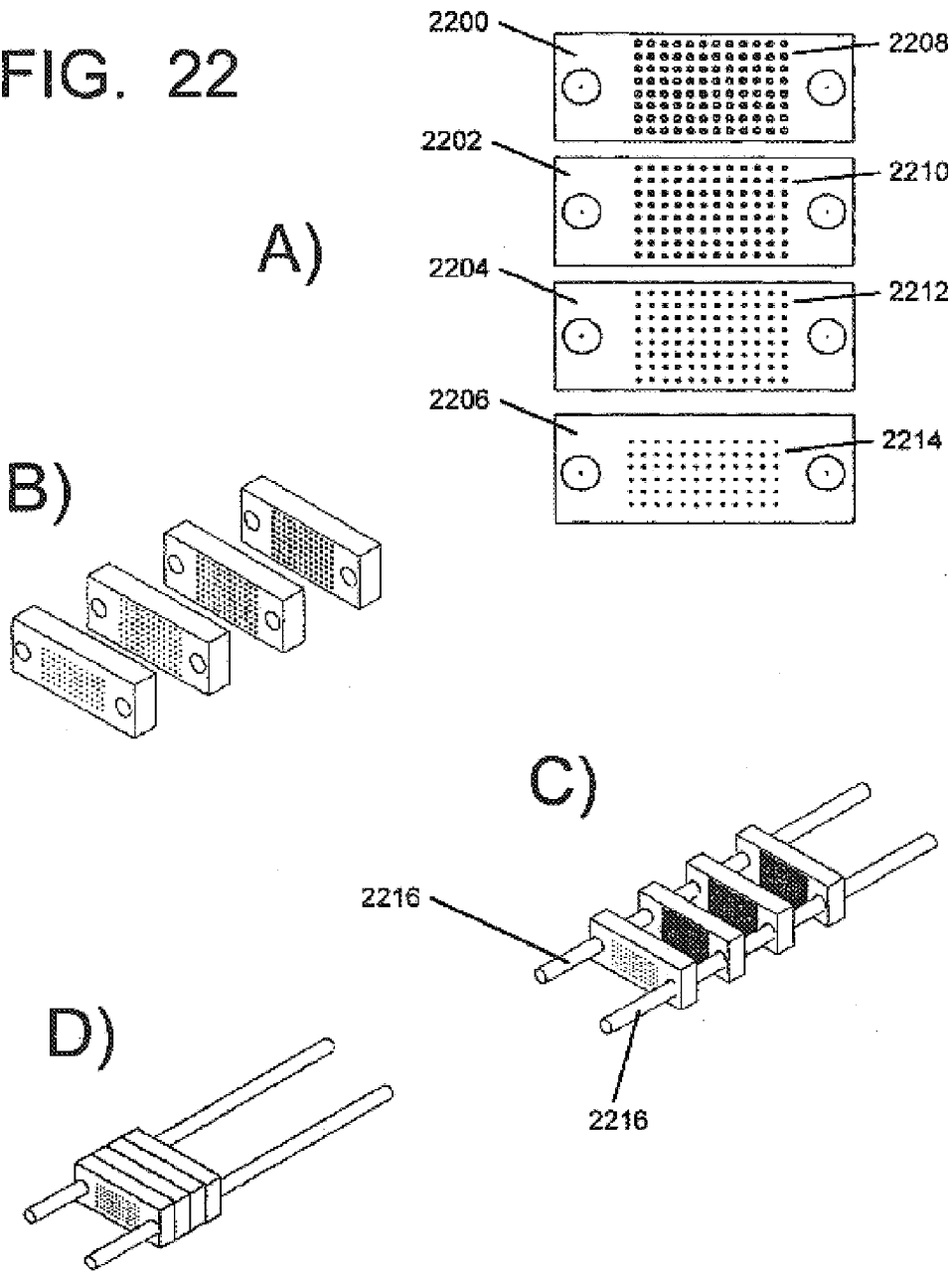
FIG. 22A shows four wafer pieces or slices with a two dimensional array of holes in the center of each slice.
FIG. 22B shows the wafer slices of FIG. 22A in stacking order.
FIG. 22C shows the stack of FIG. 22B being aligned on alignment pins.
FIG. 22D shows the stacked wafer slices of FIG. 22C connected to form a high precision waveguide piece.

FIG. 22A shows four wafer pieces 2200, 2202, 2204, 2206 with a two dimensional array of holes 2208, 2210, 2212, 2214 in the center of each piece. Note that the holes in each of the arrays of a piece are the same size, but the different pieces have different size holes with respect to one another. These pieces are then stacked (FIG. 22B) and aligned on rods or pins 2216 (FIG. 22C) so that, when fully integrated, they are pushed together in close contact (FIG. 22D). Once the pieces are stacked, and aligned with respect to one another, the holes are turned into an optical guiding medium. This is accomplished by processing the wafers and flowing an optically transparent epoxy into the holes and curing it into a hardened form. This effectively creates optical fibers inside each of the holes.

Figure 23:
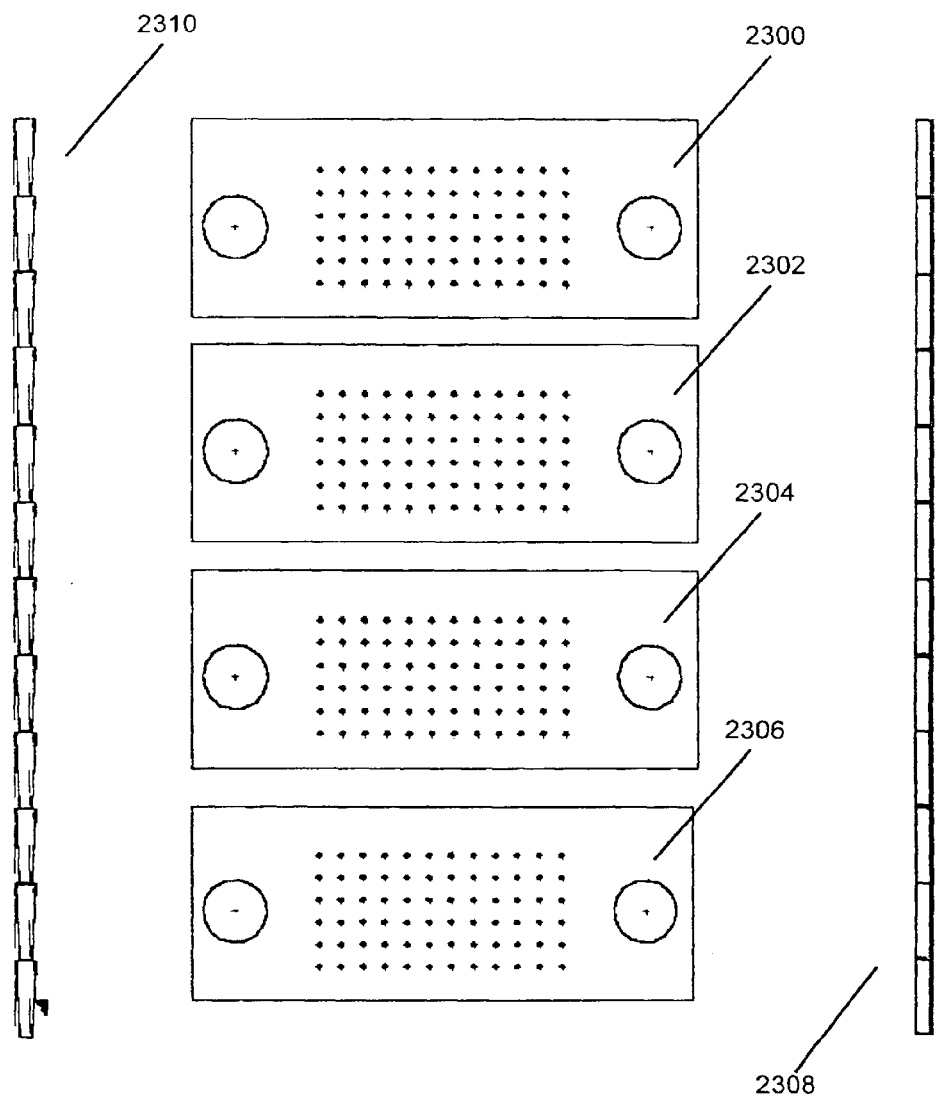
FIG. 23 shows a series of semiconductor wafer pieces fabricated with holes nearly the same size along with cutaway views of two variants thereof.

FIG. 23 shows a series of semiconductor wafer pieces fabricated 2300, 2302, 2304, 2306 with any array of guiding holes, all nearly the same size. These pieces are stacked on top of one another so that the guiding holes are all aligned. An optical epoxy is flowed through the holes in the pieces and cured to form the guiding material. Each resultant waveguide guides light from one end to the other end. As can be seen from FIG. 23, a number of pieces can be stacked together to form a collimating element made up of waveguides of arbitrary but controllable length. For example, if the wafer were 250 microns thick and twelve of them are stacked together, a piece 3 millimeters thick would result.

Ideally, if accuracy of alignment can be made high enough, all of the holes should be made perfectly straight to enable a ultra-low-loss transfer of light from one side to the other. However, as will typically be the case, if alignment between individual pieces cannot be held to tight enough tolerances, each of the pieces can have a tapered hole. The pieces are then stacked with the smaller end of one piece feeding into the larger end of the next piece in the direction of expected light travel. Thus, if the two pieces are slightly misaligned, the small end will still allow light to transfer into the next piece through the next piece's larger end. In this configuration, it is important that the pieces be arranged so that light will always traverse in the direction from the larger ends to the smaller ends to ensure that the maximum amount of light traverses each interface.

FIG. 23 also shows in cross section what one of a series of holes in an array of holes would look like in a straight sidewalls variant 2308 and a tapered sidewalls variant 2310 after stacking a number of wafer pieces. As can be seen, in the example cross sections, thirteen pieces have been stacked to achieve the resultant shape.

In another variant, by using tapered holes that are intentionally slightly offset from piece to piece in a particular direction, the hole can direct the light to another location. By using this technique creatively, a waveguide can actually "swap" or "shuffle" light among fibers. For example, with a two fiber connector will mate with another two fiber connector, light leaving fiber 1 will enter the corresponding fiber in the other half of the connector. Advantageously, by using a connector created as described herein, a stack of high precision pieces can be used to direct the light leaving fiber 1 into the fiber that does not correspond when the connectors are joined. This approach can be readily extended to multiple fibers in the same connector.

In a further variant, the same process is followed, but the holes are all tapered narrower and narrower in each successively stacked piece (i.e. the openings in the first piece are large and the holes in each successive piece in the stack tapers smaller and smaller).

This allows, for example, a one-dimensional or two-dimensional array of optical devices to be coupled to a one dimensional or two dimensional array of optical fibers when the number of optical devices exceeds the number of optical fibers and hence it becomes desirable to merge the signals from several optical devices into a single optical fiber. This is useful when redundant devices provide for backup signal capability (i.e. one device can operate as the primary device while the others coupled into the fiber can be operated as backup devices). Another application allows several optical devices, each with its own operating wavelength, to be combined into a single fiber.

Figure 24:
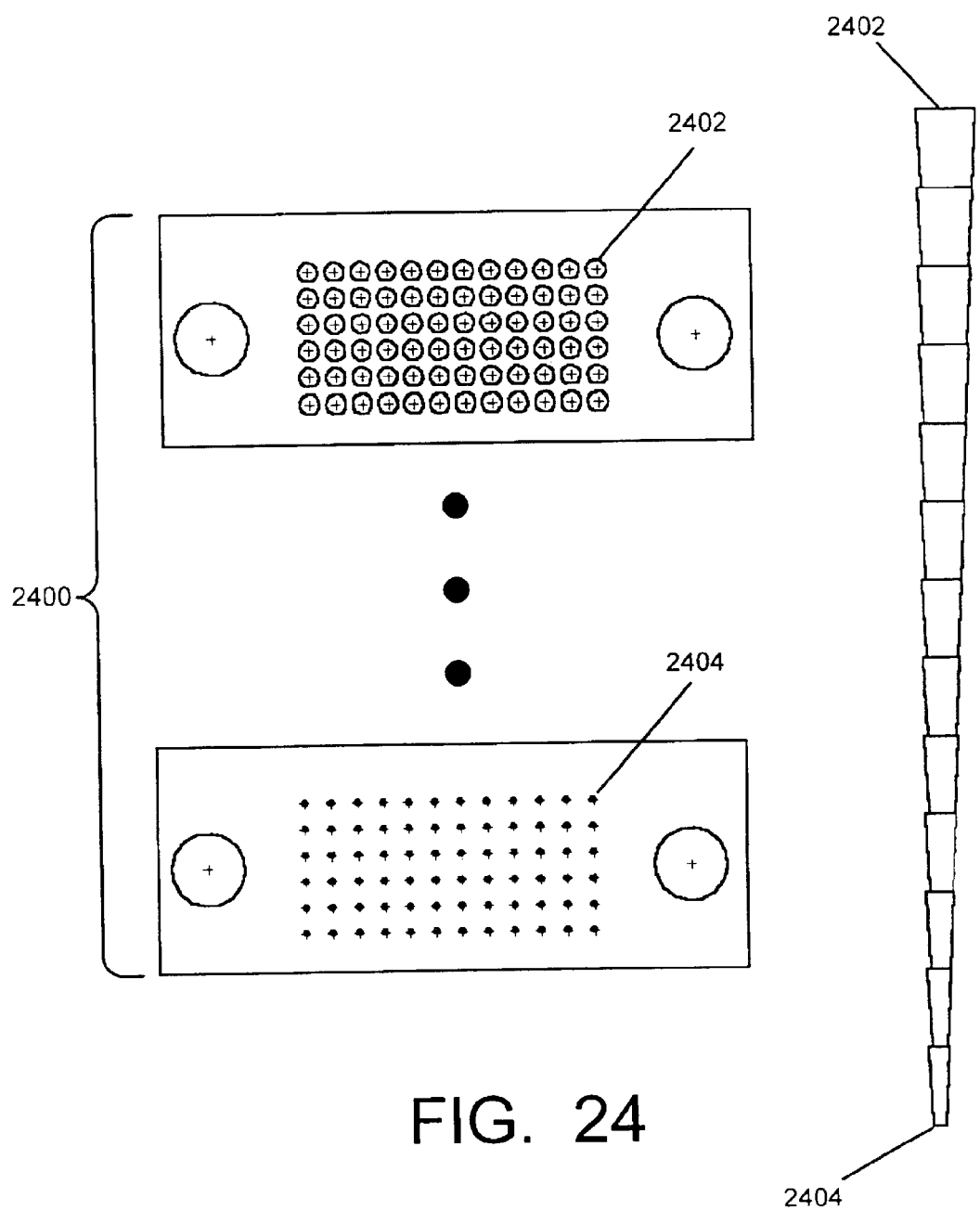
FIG. 24 shows one example tapering waveguide variant.

There are at least two ways this can be done. One, shown in FIG. 24, is to create a one-dimensional or two-dimensional array of tapers using multiple pieces 2400 which when formed into a waveguide combine the light from a larger area 2402 on one side and taper it down to a smaller area 2404 on the other side. On the larger end 2402, the opening of the tapered array pieces can have a diameter large enough to accept light from several optical devices simultaneously.

Figure 25:
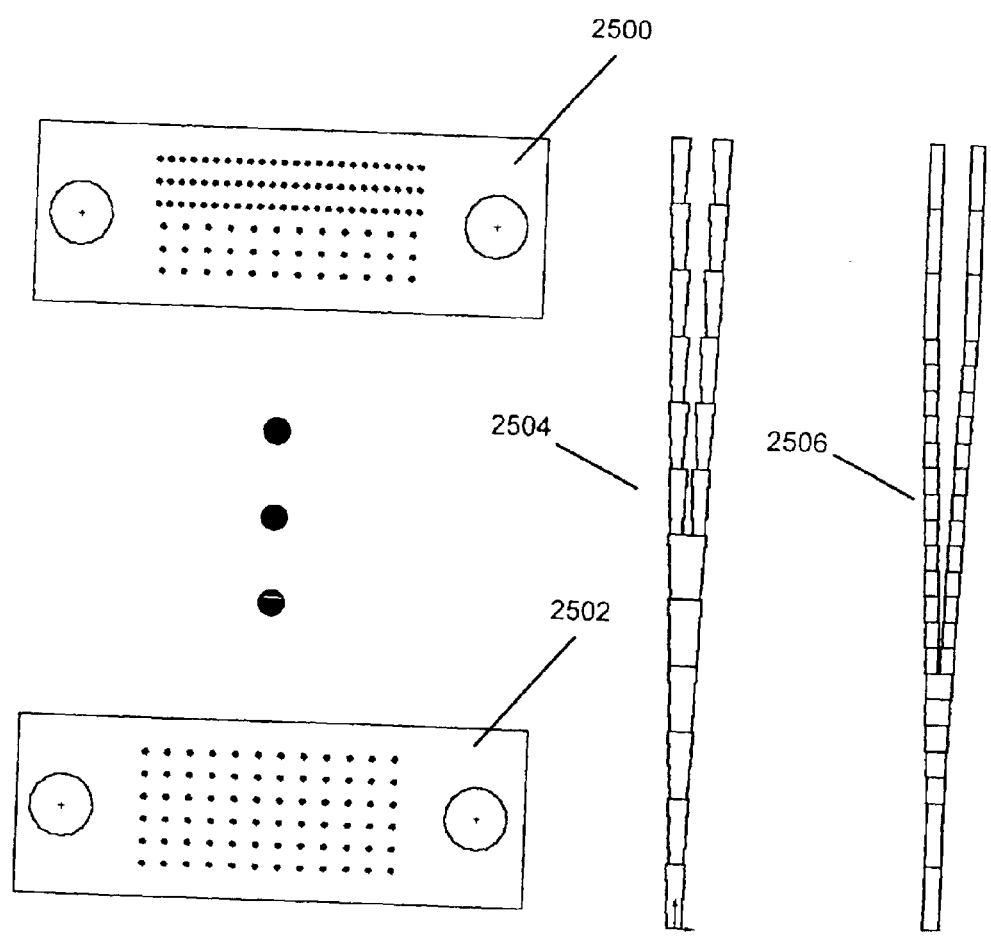
FIG. 25 shows an example of a two dimensional array of optical Y branches created using one variant of the techniques described herein.

An alternative variant, shown in FIG. 25, the pieces (only two of which 2500, 2502 are shown) are designed to be stacked so as to create a two dimensional array of optical Y branches 2504, 2506 which can combine two (or more) optical signals into single fibers. Depending upon the particular application, the Y branches can be symmetric, asymmetric or developed in random patterns to provide unique connection topologies.

In yet a further variant, by using different sized holes and offsetting them from piece to piece in the stack the same technique can be used to combine multiple waveguides into a single waveguide, for example, for combining the outputs of several optical devices or coupling multiple devices into an individual optical device.

Note that even more complex connections are possible using a similar technique, for example, 4 to 1 combining arrangements, shuffling of individual fiber outputs, combining of non-next nearest neighbor devices, etc. For example, a stack 906 of pieces from the wafer shown in FIG. 9 (stack shown in cutaway cross section not to scale) creates a 6 to 4 to 2 waveguide.

Thus, it should be understood that the technique adds a third dimension of freedom and thus allows one- or two dimensional arrays of optical devices (emitters, detectors, modulators, micro electro mechanical systems etc.) to have optical outputs which can be combined, split, routed, and shuffled in an arbitrary manner so that at the output of the stack, signals are output in a specific manner different from the input to the stack.

Figure 10B:
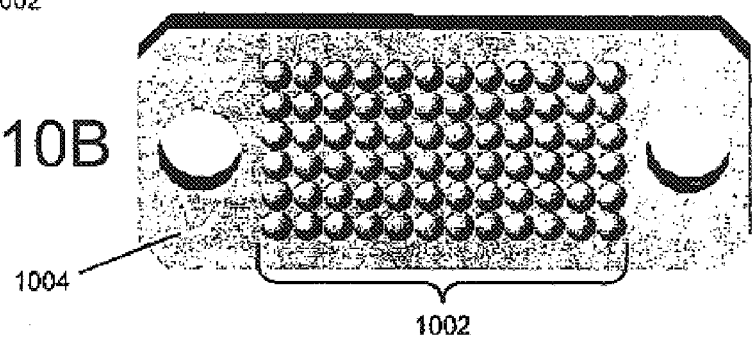
FIG. 10B shows an example high precision piece incorporating microlenses, made using another variant of the technique described herein.
Figure 14:
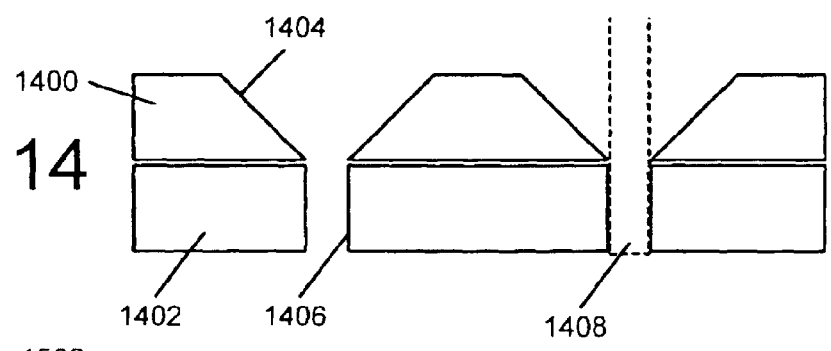
FIG. 14 shows a second approach to ensuring that an angle of insertion is minimized.

In addition, the technique allows for incorporation of other elements, for example, by inserting microlenses 1002 into a high precision piece 1004 to create an array of microlenses (FIG. 10B). This can be done by, for example, depositing microlenses in the tapered holes of high precision pieces such as made in connection with FIG. 13, 14 or 15 or in etched "stepped" holes of two or more different diameters, or dished holes (since, in either case, ease of fiber insertion is not a concern for this piece). Once such a piece is created, it can be integrated with other pieces as desired. Similarly, the approach can be used to incorporate diffraction gratings into a stack or a low precision piece.

The techniques described herein can further be used to create a single, high-density connector to connect fiber riser cables together, instead of through use of huge multi-connector assemblies as is currently done.

In a further variant, by using a high-precision piece made of silicon in a connector used to attach fiber bundles to transceiver modules containing optics attached to semiconductor wafers (e.g. a silicon opto-electronic chip), the thermal coefficient of expansion of the piece in the connector can be readily matched with the coefficient of expansion of the chip in the module. Thus the connection will not degrade appreciably due to temperature fluctuations.

Notably, while some variants of the technique described herein specifically use a combination of high-precision and low precision components, the approach is equally applicable to a single grown, molded, milled, or machined piece that can be processed as either a low-precision, a high precision or combination piece.

Figure 26A:
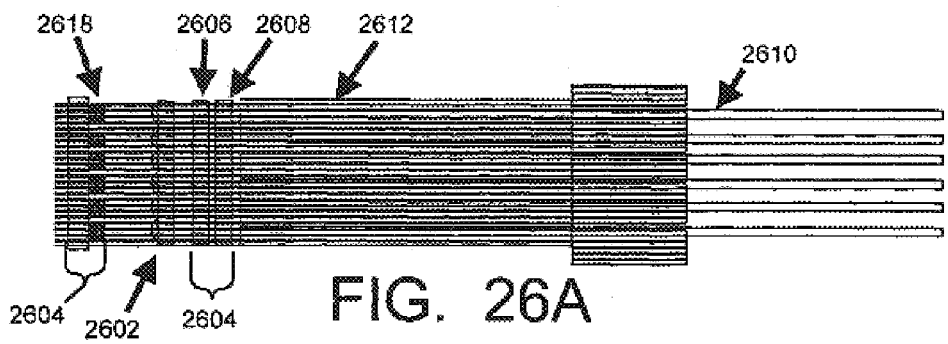
FIG. 26A shows a more complex, combination application of the techniques described herein.
Figure 26B:
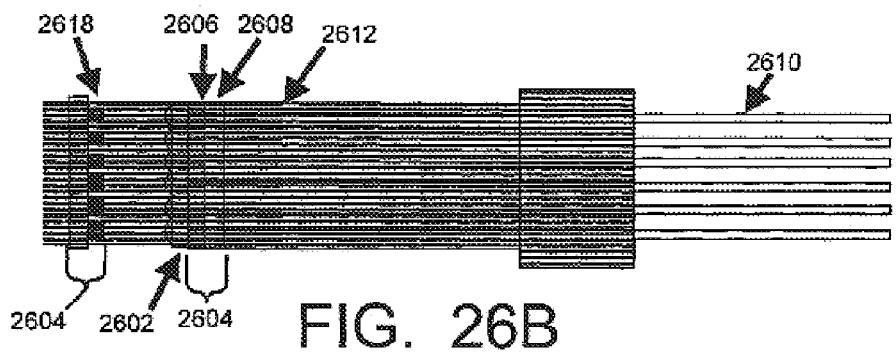
FIG. 26B shows a microlens array stacked with two high precision pieces and a low precision piece to create an ferrule compatible with an MTP, MPO, MPX or SMC style connector.
Figure 26C:
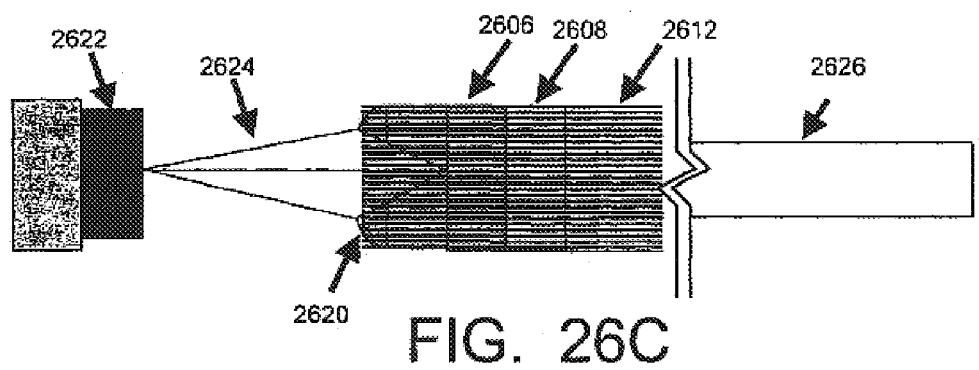
FIG. 26C shows a single optical device focussing light between a device and a single mode fiber using the arrangement of FIGS. 26A and 26B.

FIGS. 26A through 26C show a yet a further, more complex, combination application of the techniques described herein. As shown, a microlens array 2602, such as shown in FIG. 10B is incorporated as one of the elements in the stack 2604 of high precision pieces 2606, 2608. As shown in FIG. 26A, fibers 2610, in this case single mode fibers, are held by a combination of a low precision piece 2612 and the two high precision pieces 2606, 2608. The microlens array 2602 is stacked with the two high precision pieces and combined with the low precision piece 2612 to create, in this case, a ferrule 2614 compatible with an MTP, MPO, MPX or SMC style connector (FIG. 26B). In this application, the connector is designed to be coupled to an optical device array 2616, for example, an array of transmitters 2618. The microlenses 2620 focus the incident light beam more narrowly so that more accurate and/or efficient coupling between the optical devices and fibers can be obtained.

Advantageously, assuming that the array of devices was created for coupling to multimode fibers of a particular pitch, through use of the ferrule of FIG. 26B, the same array can be coupled to single mode fibers without taking any special action or changing the device array at all. FIG. 26C shows a single optical device 2622 in the array 2618 focussing light 2624 between the device 2622 and a single mode fiber 2626 through use of the arrangement shown in FIGS. 26A and 26B.

Figure 27:
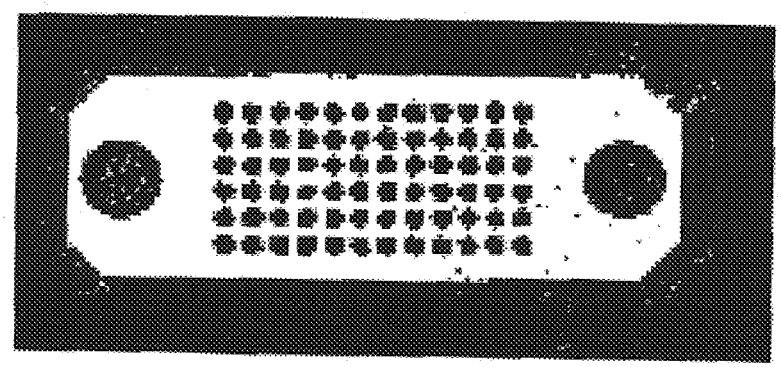
FIG. 27 is a photograph of a high precision piece created according to one variant of the techniques described herein.

FIG. 27 is a photograph of a high precision piece 2700 created as described herein.

Figure 28:
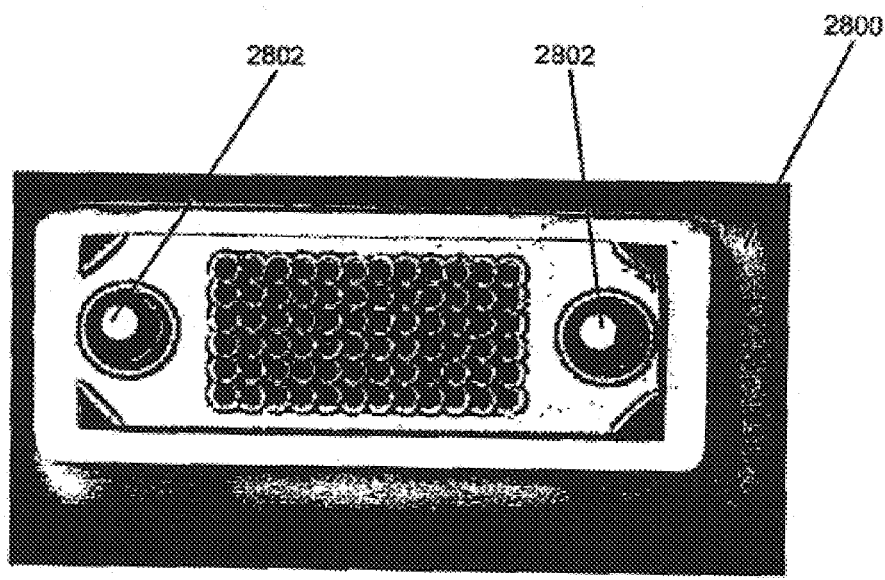
FIG. 28 is a photograph of the piece mounted in a low precision piece as described herein showing the alignment pins.

FIG. 28 is a photograph of the piece 2700 mounted in a low precision piece 2800 as described herein and showing alignment pins 2802 passing through the low precision piece 2800 and the piece 2700.

Figure 29:
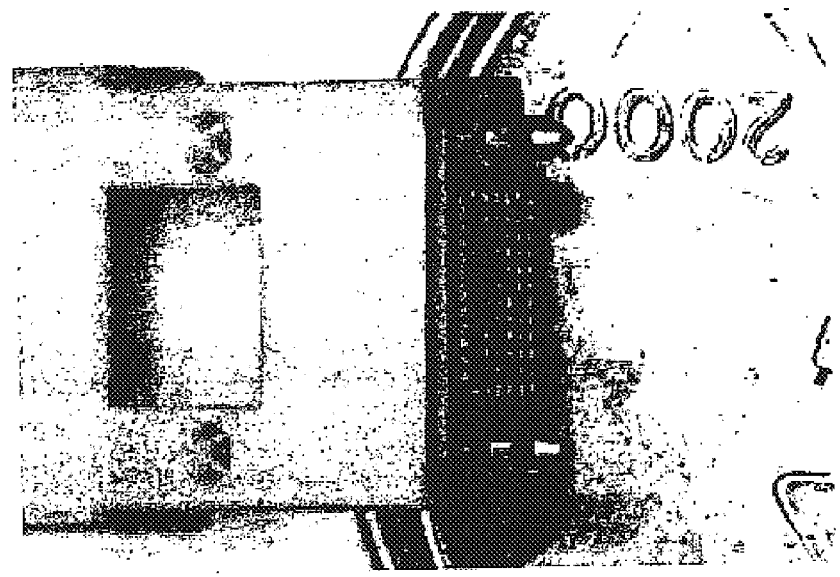
FIG. 29 is a photograph, in ¾ view of a ferrule for use in an MTP connector superimposed against a penny.

FIG. 29 is a photograph, in ¾ view of a ferrule created according to one variant of the invention, for use in an MTP connector and superimposed against a penny for relative sizing.

Figure 30:
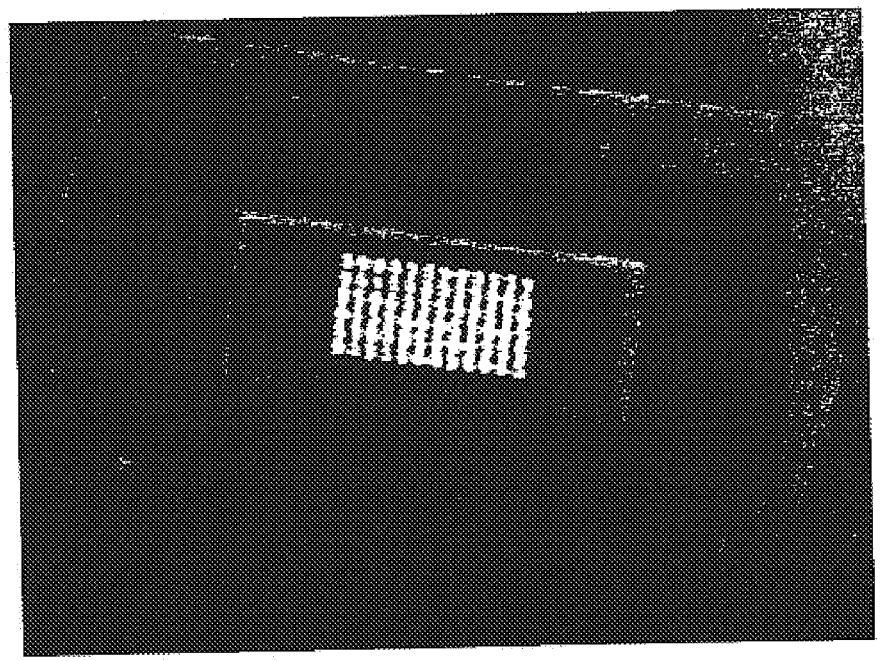
FIG. 30 is a photograph of a fully assembled MTP connector as described herein having 72 light carrying fibers.
Figure 31:
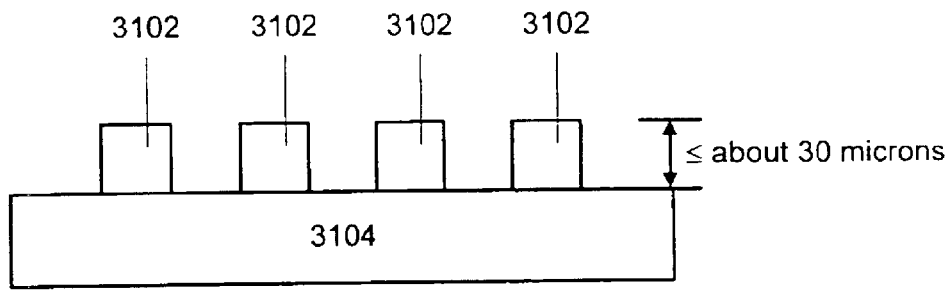
FIG. 31 shows one class of waveguide.
Figure 32:
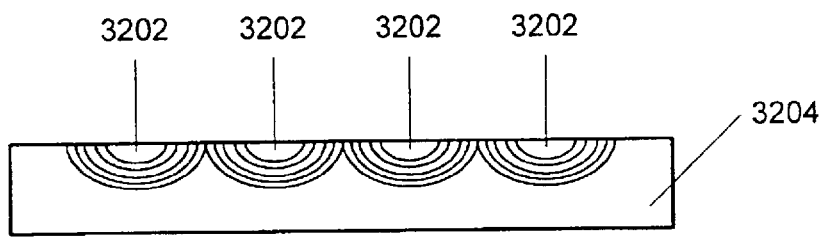
FIG. 32 shows another class of waveguide.
Figure 33:
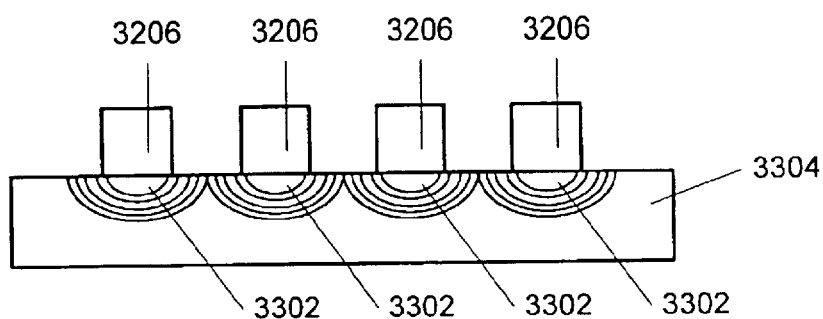
FIG. 33 shows a hybrid of the classes of waveguides of FIG. 31 and FIG. 32.

FIG. 30 is a photograph of a fully assembled MTP style connector as described herein having at least one high precision piece holding 72 light carrying fibers.

Thus, while we have shown and described various examples employing the invention, it should be understood that the above description is only representative of illustrative embodiments. For the convenience of the reader, the above description has focused on a representative sample of all possible embodiments, a sample that teaches the principles of the invention. The description has not attempted to exhaustively enumerate all possible variations. That alternate embodiments may not have been presented for a specific portion of the invention, or that further undescribed alternate embodiments or other combinations of described portions may be available, is not to be considered a disclaimer of those alternate embodiments. It can be appreciated that many of those undescribed embodiments are within the literal scope of the following claims, and others are equivalent.

What is claimed is:

1. A method of preparing a mating surface and a feature defined by a wall that will mate with the mating surface to a specified sub-micron tolerance, the method comprising:

optimizing the size of at least one of the mating surface or at least part of the wall by uniform oxidization in a slow, controlled manner over a period of several hours until the specified sub-micron tolerance is achieved.

2. A method of forming a female format connector comprising:

coupling at least one high-precision piece to a low precision piece to form a ferrule,
   the low precision piece comprising a first and second alignment openings,
   the at least one high-precision piece comprising a plurality of fiber holes, a first and second removable portions, and a third and fourth alignment openings at least in part disposed on the first and second removable portions,
   the first, second, third and fourth alignment openings sized and positioned to provide accurate alignment between the high-precision piece and the low precision piece during coupling; and modifying the third and fourth alignment openings after coupling.

3. The method of claim 2 wherein the third and fourth alignment openings before modification are cylinders having a cross section of a first diameter and the third and fourth alignment openings after modification are cylinders having a cross section of a second diameter, larger than the first diameter.

4. The method of claim 2 wherein the modifying the third and fourth alignment openings comprises changing the shape of the third and fourth alignment openings.

5. The method of claim 2 wherein the modifying the third and fourth alignment openings comprises removing the first and second removable portions.

6. A method of forming a female format connector comprising:

aligning a low precision piece and a high precision piece using a first and second alignment pins passing through a first, second, third and fourth alignment openings in the low and high precision pieces, the first and second alignment openings being in the low precision piece, the third and fourth alignment openings being in the high precision piece and being disposed at least in part on a first and second removable portions of the high precision piece, the high precision piece further having multiple fiber holes;

bonding the low precision piece to the high precision piece to form a ferrule;

removing the first and second alignment pins from the alignment openings after bonding the low precision piece and high precision piece; and modifying the third and fourth alignment openings after aligning the low precision piece and high precision piece.

7. The method of claim 6, wherein the third and fourth alignment openings are modified after aligning and bonding the low precision piece and high precision piece.

8. The method of claim 6, wherein modifying the third and fourth alignment openings comprises making the third and fourth alignment openings larger.

9. The method of claim 6, wherein modifying the third and fourth alignment openings comprises changing the shape of the third and fourth alignment openings.

10. The method of claim 6, wherein modifying the third and fourth alignment openings comprises removing the first and second removeable portions to partially remove the third and fourth alignment openings from the ferrule.

11. The method of claim 6, wherein modifying the third and fourth alignment openings comprises removing the first and second removeable portions to entirely remove the third and fourth alignment openings from the ferrule.

* * * * *